(12) United States Patent
Sakashita

(10) Patent No.: US 9,086,108 B2
(45) Date of Patent: Jul. 21, 2015

(54) DISK BRAKE

(75) Inventor: Takayasu Sakashita, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 421 days.

(21) Appl. No.: 13/430,012

(22) Filed: Mar. 26, 2012

(65) Prior Publication Data

US 2012/0261220 A1 Oct. 18, 2012

(30) Foreign Application Priority Data

Apr. 13, 2011 (JP) .................................. 2011-089268
Feb. 14, 2012 (JP) .................................. 2012-029402

(51) Int. Cl.
| F16D 65/18 | (2006.01) |
| F16D 65/56 | (2006.01) |
| F16D 121/04 | (2012.01) |
| F16D 121/24 | (2012.01) |
| F16D 123/00 | (2012.01) |
| F16D 125/36 | (2012.01) |
| F16D 125/48 | (2012.01) |
| F16D 125/54 | (2012.01) |

(52) U.S. Cl.
CPC .............. *F16D 65/18* (2013.01); *F16D 65/567* (2013.01); *F16D 2121/04* (2013.01); *F16D 2121/24* (2013.01); *F16D 2123/00* (2013.01); *F16D 2125/36* (2013.01); *F16D 2125/48* (2013.01); *F16D 2125/54* (2013.01)

(58) Field of Classification Search
CPC ..... F16D 65/18; F16D 2125/36; F16D 55/22; B60T 13/74; B60T 13/741

USPC .......... 188/18 A, 18 R, 71.1, 72.1, 72.6–72.9, 188/158

See application file for complete search history.

(56) References Cited

U.S. PATENT DOCUMENTS

| 2007/0227838 A1* | 10/2007 | Shigeta et al. ............... 188/72.7 |
| 2008/0011560 A1* | 1/2008 | Yamaguchi et al. .......... 188/158 |
| 2010/0163351 A1* | 7/2010 | Sakashita et al. ............. 188/182 |
| 2011/0315492 A1* | 12/2011 | Sakashita ..................... 188/72.1 |
| 2013/0075205 A1* | 3/2013 | Sakashita et al. ............ 188/72.3 |

FOREIGN PATENT DOCUMENTS

JP 2010-169248 8/2010

* cited by examiner

*Primary Examiner* — Vishal Sahni
(74) *Attorney, Agent, or Firm* — Wenderoth, Lind & Ponack, LLP.

(57) ABSTRACT

A disk brake including a simplified structure for retaining the braking force of a parking brake. The disk brake is equipped with a piston holding mechanism having a ball-and-ramp mechanism in which balls are moved by rotation transmitted from a motor, causing a rotary-rectilinear ramp to press a piston. The rotary-rectilinear ramp has an external thread engaged with an internal thread formed on a base nut that is immovable in a rotor axis direction relative to a caliper body. The external thread, when a force is applied thereto from the piston in the rotor axis direction, can retain the position of the rotary-rectilinear ramp in the rotor axis direction. Thus, the structure for retaining the braking force of the parking brake can be simplified to improve production efficiency.

27 Claims, 16 Drawing Sheets

Fig. 11A
Fig. 11B
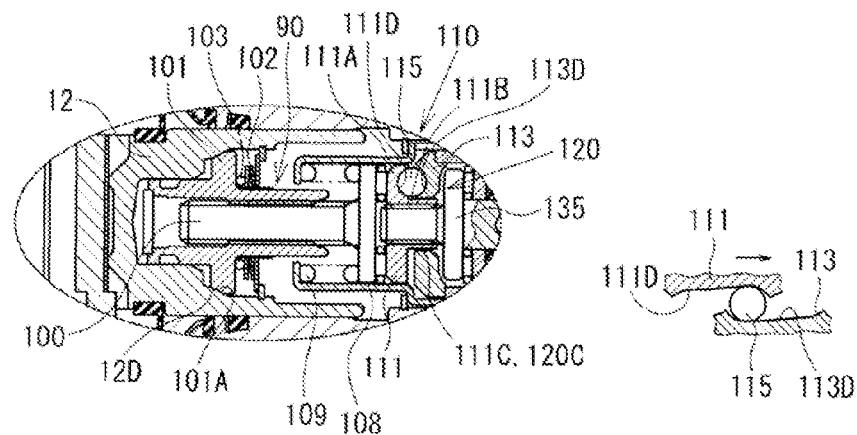
Fig. 12A
Fig. 12B
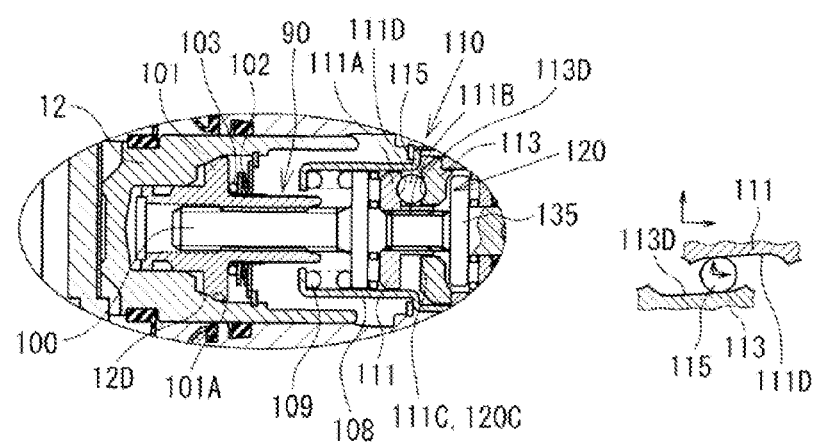

(A)

(B)

Fig. 19A
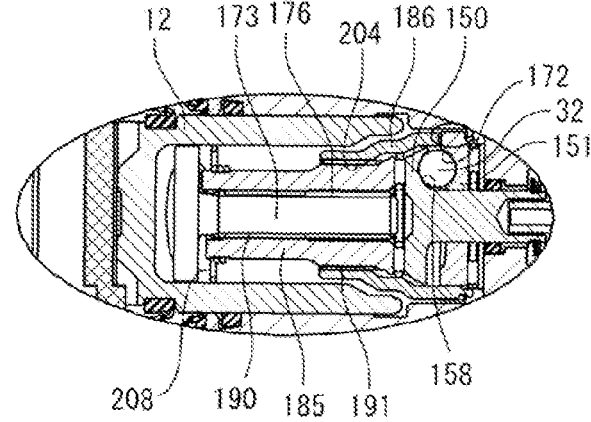
Fig. 19C
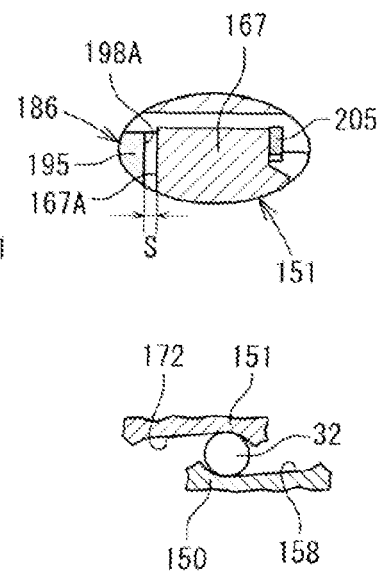
Fig. 19B
Fig. 20A
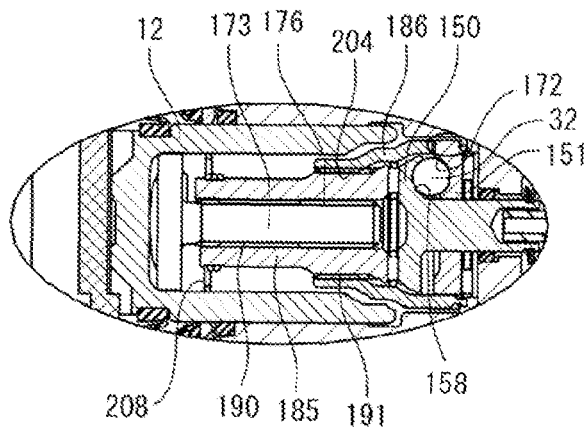
Fig. 20C
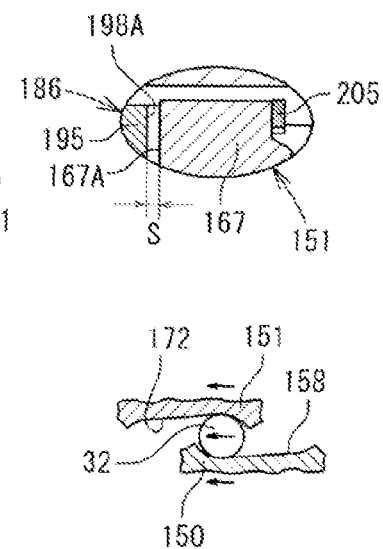
Fig. 20B Fig. 21A
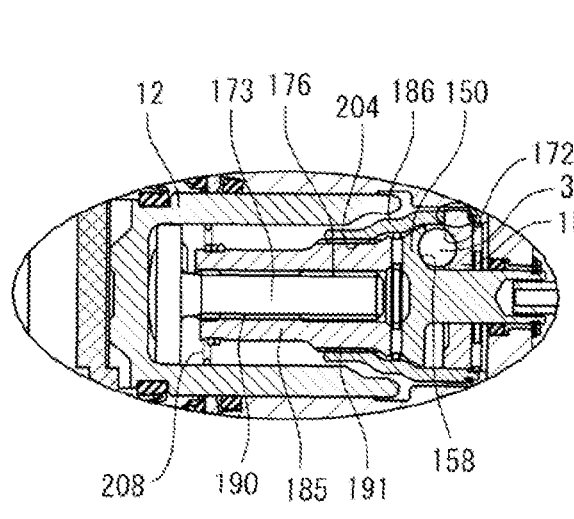
Fig. 21B
Fig. 21C
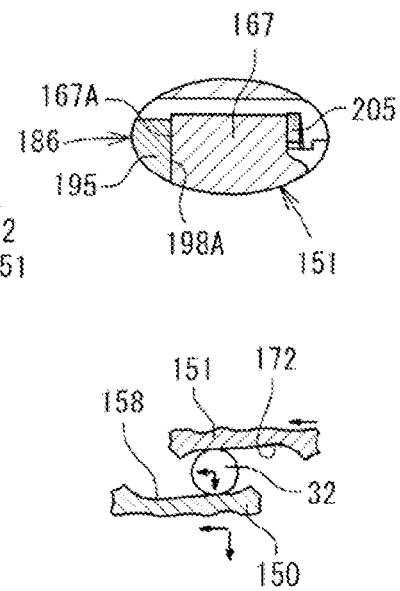
Fig. 22A
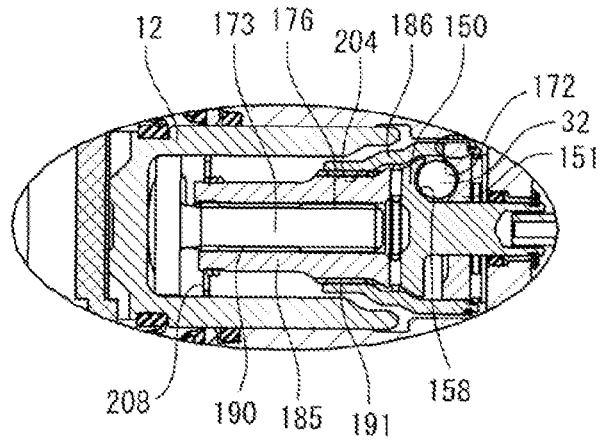
Fig. 22B
Fig. 22C
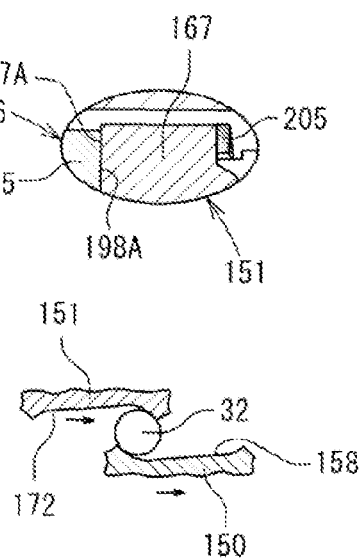

Fig. 23A
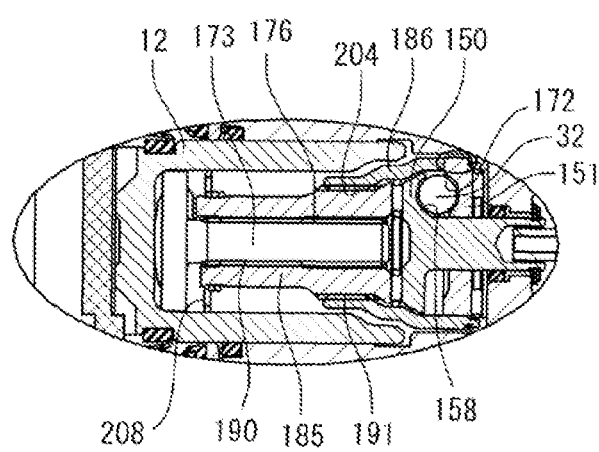
Fig. 23C
Fig. 23B
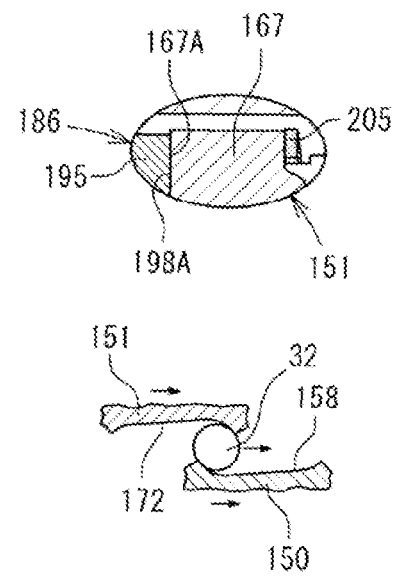
Fig. 24A
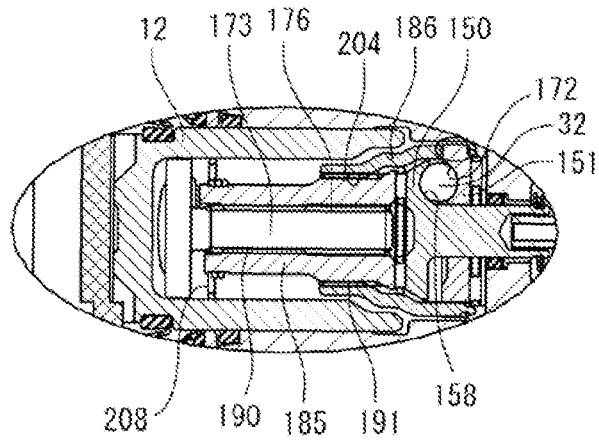
Fig. 24C
Fig. 24B
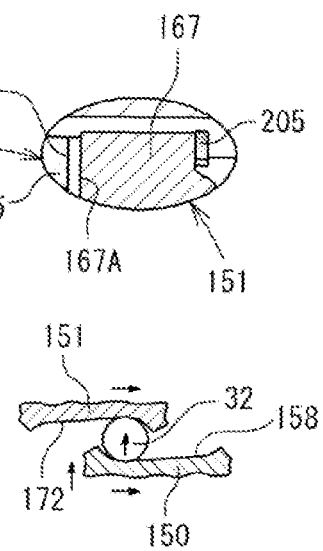

DISK BRAKE

BACKGROUND OF THE INVENTION

The present invention relates to a disk brake used for braking a vehicle.

There has heretofore been a disk brake having a planetary gear speed reduction mechanism equipped with a rotation restraining mechanism for retaining braking force when a parking brake is applied, for example (see Japanese Patent Application Publication No. 2010-169248).

SUMMARY OF THE INVENTION

The disk brake disclosed in Japanese Patent Application Publication No. 2010-169248, however, needs a complicated structure for retaining braking force, which may cause a reduction in the production efficiency of disk brakes.

An object of the present invention is to provide a disk brake improved in the production efficiency by simplifying the structure for retaining braking force when a parking brake is applied, for example.

To solve the above-described problem, the present invention provides a disk brake having a pair of pads disposed at opposite sides, respectively, of a rotor to face each other across the rotor in the direction of an axis of the rotor, a piston pressing one of the pair of pads against the rotor, a caliper body having a cylinder in which the piston is movably disposed, an electric motor provided on the caliper body, and a parking brake mechanism provided in the caliper body to propel and hold the piston in a braking position. The parking brake mechanism has a ball-and-ramp mechanism and a screw mechanism. Rotation of the electric motor causes the ball-and-ramp mechanism and the screw mechanism to move the piston to the braking position, and the screw mechanism holds the piston in the braking position.

According to the disk brake of the present invention, the structure for retaining braking force when a parking brake is applied, for example, can be simplified, and hence the production efficiency can be improved.

BRIEF DESCRIPTION OF THE DRAWINGS

FIGS. 11A to 13B are sectional views of the disk brake according to the second embodiment, showing the operation of a parking brake step by step.

FIGS. 19A to 24C are sectional views of the disk brake according to the third embodiment, showing the operation of a parking brake step by step.

DETAILED DESCRIPTION OF THE INVENTION

Figure 1:
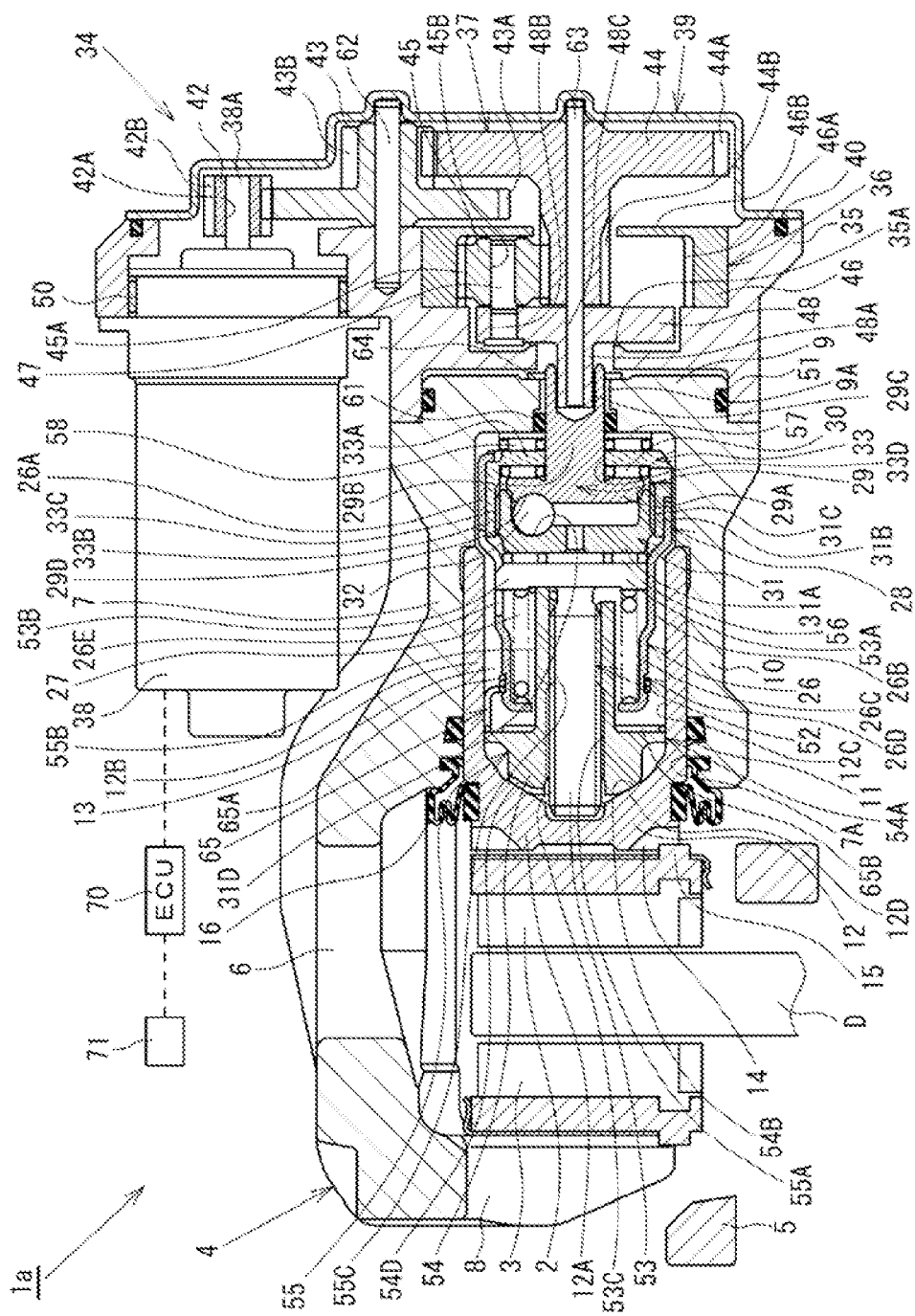
FIG. 1 is a sectional view of a disk brake according to a first embodiment of the present invention.

Embodiments of the present invention will be explained below in detail with reference to FIGS. 1 to 24C. First, a disk brake 1a according to a first embodiment of the present invention will be explained with reference to FIGS. 1 to 9B. FIG. 1 shows the disk brake 1a according to the first embodiment.

Figure 2:
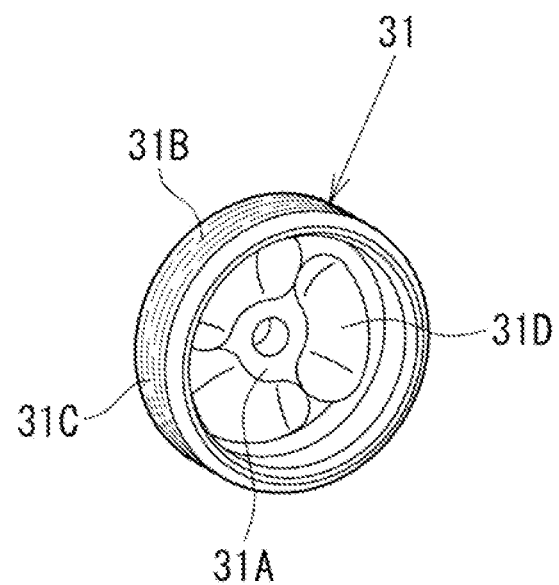
FIG. 2 is a perspective view of a rotary-rectilinear ramp of a ball-and-ramp mechanism employed in the disk brake according to the first embodiment.
Figure 3:
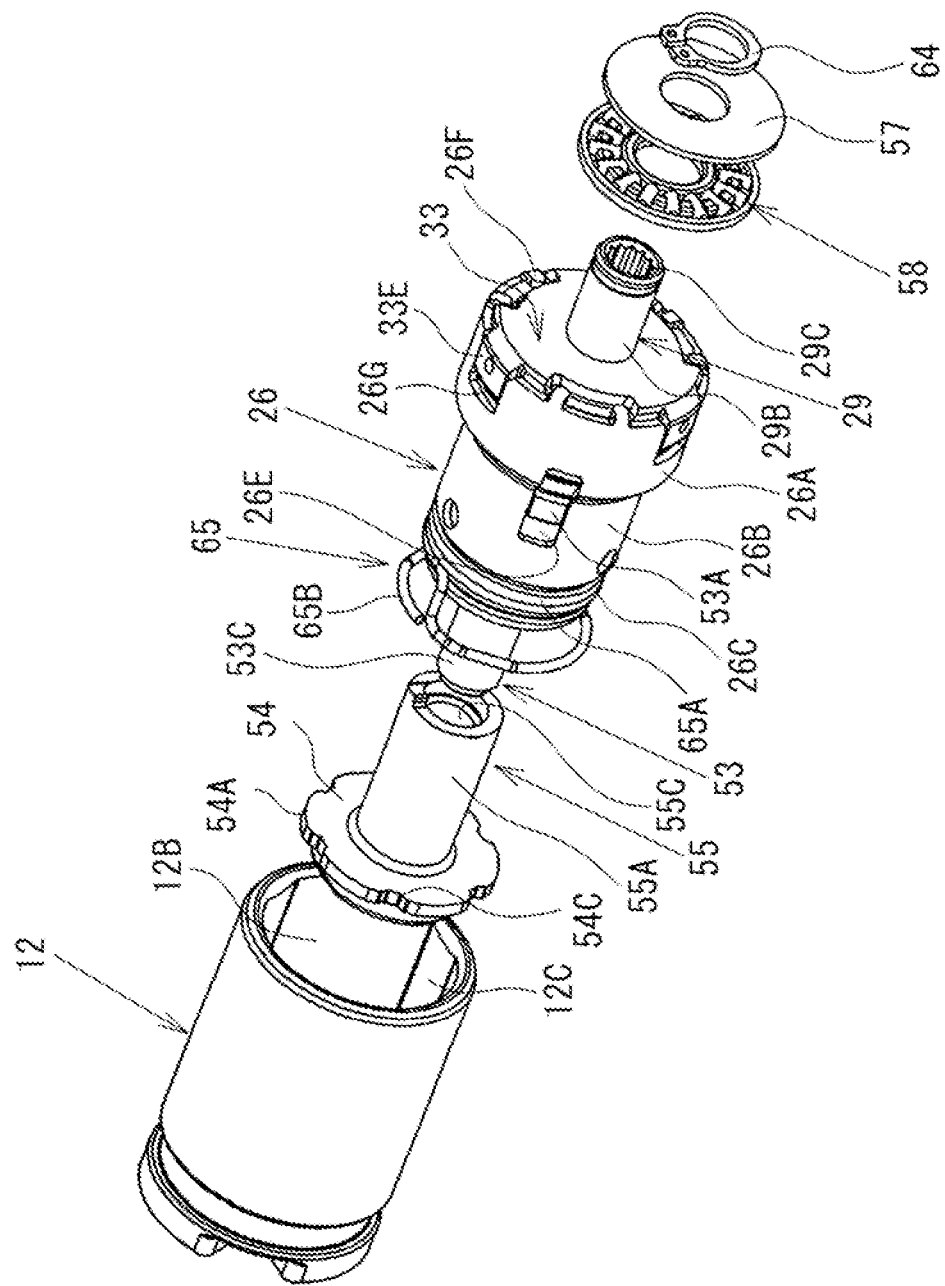
FIG. 3 is a perspective view of a piston, a screw mechanism, a ball-and-ramp mechanism, and so forth employed in the disk brake according to the first embodiment.

As shown in FIGS. 1 to 3, the disk brake 1a according to the first embodiment is provided with a pair of pads, i.e. an inner brake pad 2 and an outer brake pad 3, disposed at axially opposite sides, respectively, of a disk rotor D. The disk rotor D is attached to a rotating part of a vehicle. The disk brake 1a is further provided with a caliper 4. The disk brake 1a is a floating caliper type disk brake. It should be noted that the inner brake pad 2, the outer brake pad 3, and the caliper 4 are supported by a carrier 5 secured to a non-rotating part of the vehicle, e.g. a knuckle, so as to be movable in the axial direction of the disk rotor D.

The caliper 4 has a caliper body 6 constituting the main body of the caliper 4. The caliper body 6 has a cylinder portion 7 disposed at a proximal end of the caliper body 6 that faces the inner brake pad 2 at the inner side of the disk rotor D relative to the vehicle, and a claw portion 8 disposed at a distal end of the caliper body 6 that faces the outer brake pad 3 at the outer side of the disk rotor D relative to the vehicle. The cylinder portion 7 forms a cylinder 10, one end of which is closed. The cylinder 10 has an opening 7A at an end thereof closer to the inner brake pad 2. The other end of the cylinder 10 is closed with a bottom wall 9 having a hole 9A. The cylinder 10 has a piston seal 11 fitted to an inner peripheral portion thereof closer to the opening 7A.

A piston 12 is formed in the shape of a cup, one end of which is closed. That is, the piston 12 comprises a bottom portion 12A and a circular cylindrical portion 12B. The piston 12 is accommodated in the cylinder 10 in such a way that the bottom portion 12A faces the inner brake pad 2. The piston 12 is axially movably fitted in the cylinder 10 in contact with the piston seal 11. The space between the piston 12 and the bottom wall 9 of the cylinder 10 is defined as a hydraulic chamber 13 by the piston seal 11. The hydraulic chamber 13 is supplied with a hydraulic pressure from a hydraulic pressure source (not shown), e.g. a master cylinder, or a hydraulic pressure control unit, through a port (not shown) provided in the cylinder portion 7. The piston 12 has a recess 14 provided on the outer periphery of the bottom thereof facing the inner brake pad 2. The recess 14 is engaged with a projection 15 formed on the rear side of the inner brake pad 2. This engagement prevents the piston 12 from rotating relative to the cylinder 10 and, consequently, the caliper body 6. A dust boot 16 is interposed between the bottom portion 12A of the piston 12 and the cylinder 10 to prevent contamination from entering the cylinder 10.

A housing 35 is air-tightly attached to an end of the caliper body 6 closer to the bottom wall 9 of the cylinder 10. A cover 39 is air-tightly attached to an opening at one end of the housing 35. It should be noted that the joint between the housing 35 and the cylinder 10 is kept airtight by a seal 51. The joint between the housing 35 and the cover 39 is kept airtight by a seal 40. A motor 38 as one example of an electric motor is sealingly attached to the housing 35 with a seal 50 interposed therebetween such that the motor 38 extends in parallel to the caliper body 6. Although in this embodiment the motor 38 is disposed outside the housing 35, the arrangement may be such that the housing 35 is formed so as to cover the motor 38, and the motor 38 is accommodated in the housing 35. In this case, the seal 50 is unnecessary, and it is possible to reduce the number of man-hours required for assembling.

The caliper body 6 is equipped with a piston holding mechanism 34 as a parking brake mechanism that propels and holds the piston 12 in a braking position. Further, the caliper body 6 is equipped with a spur wheel multistage speed reduction mechanism 37 and a planetary gear speed reduction mechanism 36, which constitute a speed reduction mechanism that increases the force of rotation from the motor 38. The spur wheel multistage speed reduction mechanism 37 and the planetary gear speed reduction mechanism 36 are accommodated in the housing 35.

The piston holding mechanism 34 has a ball-and-ramp mechanism 28 that converts rotary motion from the spur wheel multistage speed reduction mechanism 37 and the planetary gear speed reduction mechanism 36, i.e. rotation of the motor 38, into motion in a rectilinear direction (hereinafter referred to as "rectilinear motion" for the sake of convenience) and that applies thrust to and moves the piston 12. The piston holding mechanism 34 further has a push rod 53 forming a part of a pressing member that presses the piston 12 in response to an operation of the ball-and-ramp mechanism 28, and a screw mechanism 52 disposed between the bottom wall 9 of the cylinder 10 and the push rod 53, i.e. between the ball-and-ramp mechanism 28 and the piston 12, to serve as a thrust retaining mechanisms that holds the piston 12 in the braking position. The ball-and-ramp mechanism 28 and the screw mechanism 52 are accommodated in the cylinder 10 of the caliper body 6. It should be noted that, in this embodiment, the spur wheel multistage speed reduction mechanism 37 and the planetary gear speed reduction mechanism 36 are provided as a speed reduction mechanism that increases the force of rotation from the motor 38 to obtain rotational force for propelling the piston 12. These mechanisms 37 and 36, however, need not necessarily be provided. That is, if the motor 38 can output sufficient rotational force to propel the piston 12, it is possible to omit either one or both of the spur wheel multistage speed reduction mechanism 37 and the planetary gear speed reduction mechanism 36.

The spur wheel multistage speed reduction mechanism 37 has a pinion 42, a first speed reduction gear 43, and a second speed reduction gear 44. The pinion 42 is formed into a tubular shape and has a hole 42A into which a rotating shaft 38A of the motor 38 is press-fitted to secure the pinion 42. The pinion 42 further has a gear 42B formed on the outer periphery thereof. The first speed reduction gear 43 has an integral structure comprising a large-diameter gear 43A meshed with the gear 42B of the pinion 42 and a small-diameter gear 43B formed to extend axially from the large-diameter gear 43A. The first speed reduction gear 43 is rotatably supported by a shaft 62 supported at one end thereof by the housing 35 and at the other end thereof by the cover 39. The second speed reduction gear 44 has an integral structure comprising a large-diameter gear 44A meshed with small-diameter gear 43B of the first speed reduction gear 43 and a small-diameter sun gear 44B formed to extend axially from the large-diameter gear 44A. The sun gear 44B constitutes a part of the planetary gear speed reduction mechanism 36 (described later). The second speed reduction gear 44 is rotatably supported by a shaft 63 supported by the cover 39.

The planetary gear speed reduction mechanism 36 has the sun gear 44B, a plurality (three in this embodiment) of planetary gears 45, an internal gear 46, and a carrier 48. Each planetary gear 45 has teeth 45A meshed with the sun gear 44B of the second speed reduction gear 44, and a hole 45B receiving a pin 47 extending from the carrier 48. The three planetary gears 45 are disposed at equal spaces on the circumference of the carrier 48.

The carrier 48 is formed in a disk-like shape and has a polygonal column 48A projecting from the center thereof toward the inner brake pad 2. The polygonal column 48A of the carrier 48 is fitted into a polygonal hole 29C provided in a circular column portion 29B of a rotary ramp 29 of the ball-and-ramp mechanism 28 (described later), thereby enabling the carrier 48 and the rotary ramp 29 to transmit rotational torque to each other. The carrier 48 has a plurality of pin-fitting holes 48B formed in an outer peripheral part thereof. The pins 47 rotatably supporting the planetary gears 45 are press-fitted and secured into the pin-fitting holes 48B, respectively. The carrier 48 and the planetary gears 45 are restrained from axial movement by a wall surface 35A of the housing 35 and an annular wall portion 46B integrally formed at an end of the internal gear 46 closer to the second speed reduction gear 44. Further, the carrier 48 has an insertion hole 48C formed in the center thereof. The shaft 63, which is supported by the cover 39 and rotatably supports the second speed reduction gear 44, is press-fitted and secured into the insertion hole 48C. Although, in this embodiment, relative rotation is restrained by the polygonal column 48A provided on the carrier 48, it is also possible to employ a mechanical element capable of transmitting rotational torque, e.g. a spline, or a key.

The internal gear 46 has an integral structure comprising an internal tooth portion having internal teeth 46A meshed with the teeth 45A of the planetary gears 45 and an annular wall portion 46B contiguously extending radially inward from an end of the internal tooth portion closer to the second speed reduction gear 44 to restrain axial movement of the planetary gears 45. The internal gear 46 is press-fitted and secured in the housing 35.

The screw mechanism 52 is constructed as a thrust retaining mechanism holding the piston 12 in the braking position. The screw mechanism 52 has a base nut 33 as a screw member that is thread-engaged with the outer periphery (first thread) of a circular cylindrical portion 31B of a rotary-rectilinear ramp 31 (described later), and a nut 55 as an abutting member that is thread-engaged with the push rod 53.

The push rod 53 has an integral structure comprising a collar portion 53A and a thread-engaging portion 53C. The collar portion 53A is disposed to axially face the rotary-rectilinear ramp 31 of the ball-and-ramp mechanism 28 across a thrust bearing 56. A coil spring 27 is interposed between the collar portion 53A and a retainer 26 (described later). The coil spring 27 constantly urges the push rod 53 toward the thrust bearing 56, i.e. toward the bottom wall 9 of the cylinder portion 7. The coil spring 27 also urges the rotary-rectilinear ramp 31 of the ball-and-ramp mechanism 28 (described later) toward the bottom wall 9 of the cylinder portion 7 through the push rod 53. It should be noted that the push rod 53 has a plurality of circumferentially spaced projections 53B provided on the outer peripheral surface of the collar portion 53A. The projections 53B are respectively fitted in a plurality of circumferentially spaced longitudinally elongated grooves 26E provided on a decreased-diameter portion 26B of the retainer 26 (described later). The fitting engagement between the projections 53B and the longitudinally elongated grooves 26E allows the push rod 53 to move axially within the range of the axial length of the longitudinally elongated grooves 26E but restrains the push rod 53 from moving in the rotational direction relative to the retainer 26.

The nut 55 has an integral structure comprising a circular cylindrical portion 55B at one end thereof and a flange portion 54 at the other end thereof and having a hole 55A, which is a through-hole. The nut 55 has a T-shape in axial sectional view and a mushroom-like shape in external view. The peripheral wall of the hole 55A has a thread-engaging portion 55C formed at a position corresponding to the cylindrical portion 55B. The thread-engaging portion 55C serves as an abutting member thread, which is engaged with the thread-engaging portion 53C (third thread) of the push rod 53.

The flange portion 54 has a plurality of circumferentially spaced projections 54A formed on the outer peripheral end thereof. The projections 54A respectively abut against a plurality of circumferentially spaced axially extending planar portions 12C formed on the inner peripheral surface of the cylindrical portion 12B of the piston 12. The abutment of the projections 54A against the planar portions 12C allows the nut 55 to move axially relative to the piston 12 but restrains the nut 55 from moving in the rotational direction relative to the piston 12. The nut 55 has a sloped surface 54B formed on the distal end surface of the flange portion 54. The sloped surface 54B is abuttable against a sloped surface 12D formed on the inner side of the bottom portion 12A of the piston 12. When the sloped surface 54B of the flange portion 54 of the nut 55 abuts against the sloped surface 12D of the piston 12, rotational force from the motor 38 is transmitted to the piston 12 through the push rod 53, the nut 55, and the flange portion 54, which constitute the screw mechanism 52. Consequently, the piston 12 advances. It should be noted that the flange portion 54 of the nut 55 has a plurality of grooves 54C (see FIG. 3) formed on the projections 54A and a plurality of grooves 54D on the sloped surface 54B. The grooves 54C and 54D allow a space surrounded by the bottom portion 12A of the piston 12 and the flange portion 54 to communicate with the hydraulic chamber 13, thereby enabling circulation of brake fluid, and ensuring air bleedability for the above-described space.

The thread-engaging portions 53C and 55C of the push rod 53 and the nut 55 are set so that the reverse efficiency is not more than 0, i.e. so as to exhibit large irreversibility, in order to prevent the nut 55 from being rotated by an axial load applied from the piston 12 to the rotary-rectilinear ramp 31. In this embodiment, the push rod 53 and the nut 55, which is an abutting member, constitute a pressing member.

The ball-and-ramp mechanism 28 has a rotary ramp 29 as an input member, a rotary-rectilinear ramp 31 as a follower member, and balls 32 interposed between the rotary ramp 29 and the rotary-rectilinear ramp 31. In this embodiment, the rotary-rectilinear ramp 31 also functions as a member constituting the above-descried screw mechanism 52 in cooperation with the base nut 33 serving as a screw member.

The rotary ramp 29 has an integral structure comprising a disk-shaped rotary plate 29A and a circular column portion 29B extending substantially from the center of the rotary plate 29A. Thus, the rotary ramp 29 has a T-shape in axial sectional view. The column portion 29B extends through an insertion hole 33D provided in a bottom wall 33A of the base nut 33 and through the hole 9A in the bottom wall 9 of the cylinder 10. The distal end of the column portion 29B is provided with a polygonal hole 29C that is fitted with the polygonal column 48B provided on the carrier 48. A surface of the rotary plate 29A on the side thereof remote from the column portion 29B has a plurality (three in this embodiment) of ball grooves 29D arcuately extending along the circumferential direction with a predetermined angle of inclination and having an arcuate cross-section in the diametrical direction. The rotary plate 29A is rotatably supported with respect to the bottom wall 33A of the base nut 33 by a thrust bearing 30. A seal 61 is provided between the hole 9A in the bottom wall 9 of the cylinder 10 and the outer peripheral surface of the column portion 29B of the rotary ramp 29 to maintain the liquid-tightness of the hydraulic chamber 13. It should be noted that a retaining ring 64 is fitted to the distal end of the column portion 29B of the rotary ramp 29 to restrain movement of the rotary ramp 29 toward the inner and outer brake pads 2 and 3 relative to the caliper body 6, i.e. movement of the rotary ramp 29 in the rotor axis direction. The above-described restraint of the rotary ramp 29 prevents the base nut 33 from moving in the rotor axis direction relative to the caliper body 6. Accordingly, an internal thread 33C formed on the base nut 33 is also prevented from moving in the rotor axis direction relative to the caliper body 6.

The rotary-rectilinear ramp 31 is, as also shown in FIG. 2, formed in the shape of a circular cylinder, one end of which is closed. That is, the rotary-rectilinear ramp 31 comprises a disk-shaped rotary-rectilinear plate 31A and a circular cylindrical portion 31B extending from the outer peripheral end of the rotary-rectilinear plate 31A. A surface of the rotary-rectilinear plate 31A that faces the rotary plate 29A of the rotary ramp 29 has a plurality (three in this embodiment) of ball grooves 31D arcuately extending along the circumferential direction with a predetermined angle of inclination and having an arcuate cross-section in the diametrical direction. The cylindrical portion 31B has an external thread 31C formed on the outer peripheral surface thereof. The external thread 31C serves as a first thread, which is engaged with an internal thread 33C (second thread) provided on the inner peripheral surface of a circular cylindrical portion 33B of the base nut 33.

The base nut 33 is formed in the shape of a circular cylinder, one end of which is closed. That is, the base nut 33 comprises a bottom wall 33A and a circular cylindrical portion 33B extending from the outer peripheral end of the bottom wall 33A. The cylindrical portion 33B has an internal thread 33C formed on the inner peripheral surface thereof. The internal thread 33C serves as a second thread, which is engaged with the external thread 31C (first thread) provided on the outer peripheral surface of the cylindrical portion 31B of the rotary-rectilinear ramp 31. The base nut 33 has an insertion hole 33D formed substantially in the center of the bottom wall 33A. The column portion 29B of the rotary ramp 29 is inserted through the insertion hole 33D. The base nut 33 has the column portion 29B of the rotary ramp 29 inserted through the insertion hole 33D of the bottom wall 33A such that the rotary-rectilinear ramp 31 and the rotary plate 29A of the rotary ramp 29 are accommodated in the cylindrical portion 33B. In addition, the base nut 33 has the bottom wall 33A held between a thrust bearing 30 and a thrust bearing 58, which are disposed between the bottom wall 9 of the cylinder 10 and the rotary plate 29A of the rotary ramp 29. Thus, the base nut 33 is rotatably supported with respect to the bottom wall 9 and the cylinder 10 through the thrust bearing 58 and a thrust washer 57. The base nut 33, however, is restrained from moving in the rotational direction relative to the retainer 26 by fitting engagement between a plurality of projections 33E (see FIG. 3) provided on the outer periphery of the base nut 33 and a plurality of recesses 26G (see FIG. 3) provided on the retainer 26. The retainer 26 has a large-diameter portion 26A having a plurality of retaining projections 26F (see FIG. 3) formed on the rear end thereof. After the base nut 33 has been assembled at a predetermined position in the retainer 26, the retaining projections 26F are bent toward the center of the retainer 26, thereby restraining movement of the base nut 33 toward the second speed reduction gear 44.

It should be noted that the external thread 31C of the cylindrical portion 31B of the rotary-rectilinear ramp 31 and the internal thread 33C provided on the cylindrical portion 33B of the base nut 33 are formed as follows. When the rotary-rectilinear ramp 31 is moved away from the rotary ramp 29 by the rolling action of the balls 32 between the mutually opposing ball grooves 29D and 31D of the rotary ramp 29 and the rotary-rectilinear ramp 31 when the rotary ramp 29 is rotated in one direction, the rotary-rectilinear ramp 31 moves away from the base nut 33 when the rotary-rectilinear ramp 31 rotates in the same direction as the rotary ramp 29.

The balls 32 are steel balls serving as rolling members. There are three balls 32 provided in this embodiment. The balls 32 are each interposed between one ball groove 29D of the rotary plate 29A of the rotary ramp 29 and one ball groove 31D of the rotary-rectilinear plate 31A of the rotary-rectilinear ramp 31. When rotational torque is applied to the rotary ramp 29, the balls 32 roll between the ball grooves 29D and 31D. When the balls 32 roll, the rotary-rectilinear ramp 31, which is in thread engagement with the base nut 33, is propelled in the axial direction while rotating relative to the base nut 33 when the base nut 33 is not rotated relative to the cylinder 10. At this time, the rotary-rectilinear ramp 31 is propelled in the axial direction until balance is achieved between rotational torque of the rotary-rectilinear ramp 31 generated by the rolling action of the balls 32 and rotational resistance torque between the external thread 31C and the internal thread 33C, at which the rotary-rectilinear ramp 31 and the base nut 33 are thread-engaged with each other. In addition, the external thread 31C and the internal thread 33C, which serve as respective thread-engaging portions of the rotary-rectilinear ramp 31 and the base nut 33, are set so that the base nut 33 cannot be rotated by an axial load applied from the piston 12 to the rotary-rectilinear ramp 31, i.e. so that the reverse efficiency of the external and internal threads 31C and 33C is not more than 0. In other words, the external and internal threads 31C and 33C are configured to exhibit large irreversibility. It should be noted that the ball grooves 29D and 31D may be recessed at midpoint of the slope along the circumferential direction or may be changed in slope at some midpoint.

The retainer 26 is formed in a substantially cylindrical shape as a whole. That is, the retainer 26 comprises a large-diameter portion 26A located at a side thereof closer to the bottom wall 9 of the cylinder 10, a decreased-diameter portion 26B extending from the large-diameter portion 26A toward the opening 7A of the cylinder 10 while being gradually reduced in diameter, and a small-diameter portion 26C extending from the decreased-diameter portion 26B toward the opening 7A of the cylinder 10. The large-diameter portion 26A has a plurality of retaining projections 26F (see FIG. 3) formed on the distal end (right-hand end in FIG. 1) thereof. The retaining projections 26F are partially bent toward the center of the large-diameter portion 26A to engage and retain the base nut 33. The decreased-diameter portion 26B of the retainer 26 is provided with a plurality of circumferentially spaced longitudinally elongated grooves 26E, which are fitted with the corresponding projections 53B provided on the collar portion 53A of the push rod 53. The fitting of the projections 53B in the grooves 26E prevents the push rod 53 from rotating relative to the retainer 26 and allows the push rod 53 to move axially relative to the retainer 26 through the longitudinally elongated grooves 26E.

The outer periphery of the small-diameter portion 26C of the retainer 26 is wound with a coil 65A of a spring clutch 65 as a one-way clutch member. The spring clutch 65 applies rotational torque to the retainer 26 when rotating in one direction but applies substantially no rotational torque to the retainer 26 when rotating in the other direction. In this embodiment, the spring clutch 65 applies rotational resistance torque to the retainer 26 when rotating in a direction in which the nut 55 moves toward the ball-and-ramp mechanism 28. It should be noted that the magnitude of rotational resistance torque of the spring clutch 65 is larger than rotational resistance torque generated between the thread-engaging portions 31C and 33C of the rotary-rectilinear ramp 31 and the base nut 33 by the urging force of the coil spring 27 when the rotary-rectilinear ramp 31 and the base nut 33 axially move toward each other. The spring clutch 65 has a ring portion 65B formed on the distal end (left-hand end in FIG. 1) thereof. The ring portion 65B abuts against the planar portions 12C of the piston 12 in the same way as the projections 54A of the nut 55. Consequently, the spring clutch 65 is axially movable relative to the piston 12 but restrained from moving in the direction of rotation. In this embodiment, the external thread 31C of the rotary-rectilinear ramp 31, the base nut 33, the retainer 26, the push rod 53, and the nut 55 constitute a screw mechanism.

The motor 38 is connected with an electronic control unit (ECU) 70 as a control unit that drivingly controls the motor 38. The ECU 70 is connected with a parking switch 71 that is actuated to instruct actuation and release of the parking brake. The ECU 70 can also be activated based on a signal from a vehicle-side control unit (not shown) without actuating the parking switch 71.

Next, the operation of the disk brake 1a according to the first embodiment will be explained. Let us explain, first, a braking operation of the disk brake 1a used as an ordinary hydraulic brake operating in response to an operation of a brake pedal. When the brake pedal is depressed by the driver, a hydraulic pressure corresponding to the brake pedal pressure (i.e. depressing force applied to the brake pedal) is supplied to the hydraulic chamber 13 in the caliper 4 from a master cylinder through a hydraulic circuit (both of which are not shown). Consequently, the piston 12 advances (moves leftward in FIG. 1) from an original position, i.e. non-braking position, while elastically deforming the piston seal 11, causing the inner brake pad 2 to be pressed against the disk rotor D. Then, the caliper body 6 is moved rightward in FIG. 1 relative to the carrier 5 by a counterforce to the pressing force of the piston 12, causing the outer brake pad 3, which is attached to the claw portion 8, to be pressed against the disk rotor D. As a result, the disk rotor D is clamped between the inner and outer brake pads 2 and 3, thus generating frictional force and, eventually, vehicle braking force.

When the driver releases the brake pedal, the supply of hydraulic pressure from the master cylinder stops, resulting in a reduction in hydraulic pressure in the hydraulic chamber 13. Consequently, the piston 12 is retracted to the original position by a restoring force of elastic deformation of the piston seal 11, and thus the braking force is canceled. Incidentally, as the inner and outer brake pads 2 and 3 wear out, the travel of the piston 12 increases. When, as a result of the increase of the travel thereof, the piston 12 moves in excess of the limit of elastic deformation of the piston seal 11, slide occurs between the piston 12 and the piston seal 11. This slide moves the original position of the piston 12 relative to the caliper body 6, thereby allowing the pad clearance to be adjusted to a constant level.

Figure 4A:
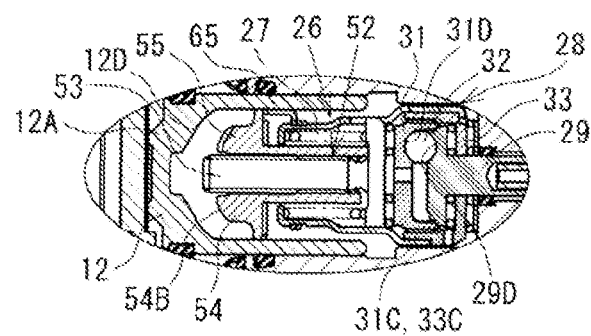
FIGS. 4A to 9B are sectional views of the disk brake according to the first embodiment, showing the operation of a parking brake step by step.
Figure 4B:
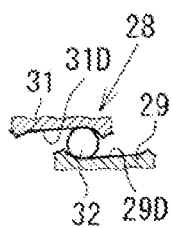

The following is an explanation of an operation of the disk brake 1a when used as a parking brake, which is an example of an operation for maintaining the vehicle in a stopped position. The following explanation will be made with reference to FIGS. 4A to 9B and also to FIG. 1. FIGS. 1, 4A and 4B show the disk brake 1a when the parking brake is in a released position. When, in this state, the parking switch 71 is actuated to activate the parking brake, the ECU 70 drives the motor 38 to rotate the sun gear 44B of the planetary gear speed reduction mechanism 36 through the spur wheel multistage speed reduction mechanism 37. The rotation of the sun gear 44B causes the carrier 48 to rotate through the planetary gears 45. The rotational force of the carrier 48 is transmitted to the rotary ramp 29.

In this regard, the rotary-rectilinear ramp 31 of the ball-and-ramp mechanism 28 is constantly subjected to the urging force of the coil spring 27 transmitted thereto through the push rod 53. Therefore, in order for the rotary-rectilinear ramp 31 to advance (move leftward in FIG. 1) relative to the caliper body 6, a thrust more than a certain level, that is, rotational torque T1, is required. Meanwhile, when the inner and outer brake pads 2 and 3 and the disk rotor D are not in contact with each other and there is therefore no pressing force to the disk rotor D from the piston 12, rotational torque T2 required to rotate the push rod 53 is sufficiently smaller than the rotational torque T1 required to advance the rotary-rectilinear ramp 31. Further, when the parking brake is to be activated, rotational resistance torque T3 is not applied by the spring clutch 65, either.

Figure 5A:
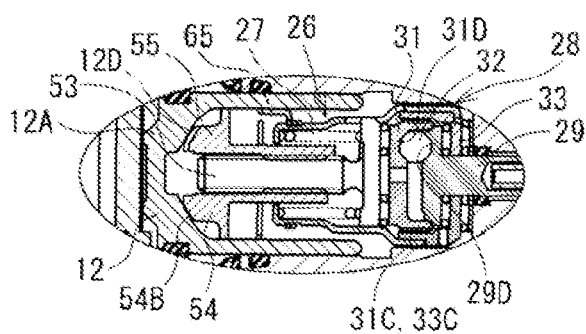
Figure 5B:
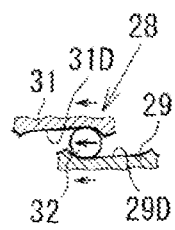

Accordingly, the rotary-rectilinear ramp 31 does not advance at the beginning of the transmission of rotational force from the carrier 48 to the rotary ramp 29. Therefore, as shown in FIGS. 5A and 5B, the rotary ramp 29 and the rotary-rectilinear ramp 31 start to rotate together. Almost all of the rotational force, except a mechanical loss, is transmitted to the retainer 26 and the push rod 53 from the thread-engaging portions 31C and 33C of the rotary-rectilinear ramp 31 and the base nut 33. Accordingly, the screw mechanism 52 operates in a favorable condition of high mechanical efficiency. That is, the rotational force of the carrier 48 causes the rotary ramp 29, the rotary-rectilinear ramp 31, the base nut 33, the retainer 26, and the push rod 53 to rotate together as one unit. The rotation of the push rod 53 causes the nut 55 to advance (move leftward in FIG. 1). Consequently, the sloped surface 54B of the flange portion 54 of the nut 55 abuts against and presses the sloped surface 12D of the piston 12, thereby causing the piston 12 to advance.

Figure 6A:
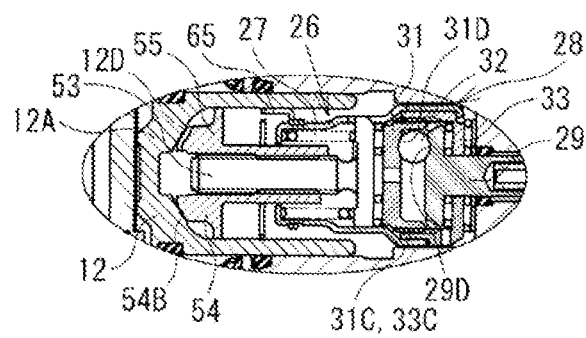
Figure 6B:
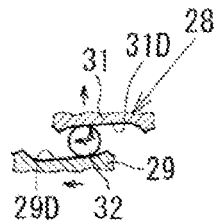

When the motor 38 is further driven and, consequently, pressing force to be applied to the disk rotor D from the piston 12 starts to be generated by the action of the screw mechanism 52, rotational resistance increases, which is generated in the thread engagement between the push rod 53 and the nut 55 by axial force due to the pressing force. Consequently, the rotational torque T2 required to advance the nut 55 increases. Eventually, the required rotational torque T2 becomes larger than the rotational torque T1 required to activate the ball-and-ramp mechanism 28, i.e. to advance the rotary-rectilinear ramp 31. As a result, the rotation of the push rod 53 stops, and the rotation of the base nut 33 stops through the retainer 26, which is restrained from rotating relative to the push rod 53. Consequently, as shown in FIGS. 6A and 6B, the rotary-rectilinear ramp 31 advances axially while rotating, thereby causing the piston 12 to advance through the screw mechanism 52, i.e. the push rod 53 and the nut 55, resulting in an increase of the pressing force applied to the disk rotor D from the piston 12. At this time, the rotary-rectilinear ramp 31 is subjected to the sum of a thrust generated at the ball grooves 31D by the application of rotational torque from the rotary ramp 29 and a thrust generated by the thread engagement with the base nut 33. Further, at this time, the push rod 53 advances against the urging force of the coil spring 27. In this embodiment, first, the screw mechanism 52 operates to advance the nut 55, thereby causing the piston 12 to advance to obtain pressing force to be applied to the disk rotor D. Therefore, it is possible, by the operation of the screw mechanism 52, to adjust the original position of the nut 55 relative to the piston 12, which changes with the wear of the inner and outer brake pads 2 and 3 with time.

Here, the lead L of the ball-and-ramp mechanism 28 (i.e. the distance that the rotary-rectilinear ramp 31 advances when the rotary ramp 29 makes one complete turn) may be given by the following expression:

$$L = L_{screw} \times L_{B\&R} / (L_{screw} + L_{B\&R})$$

In the above expression, $L_{screw}$ is the lead of the thread-engaging portions 31C and 33C of the rotary-rectilinear ramp 31 and the base nut 33, and $L_{B\&R}$ is the lead of the ball grooves 29D and 31D. If $L_{screw}$=3 mm and $L_{B\&R}$=3 mm, for example, then L=1.5 mm. Thus, the force increasing ratio (ratio of thrust to rotational torque) can be increased by reducing the lead.

The ECU 70 drives the motor 38 until the pressing force applied to the disk rotor D from the inner and outer brake pads 2 and 3 reaches a predetermined value, for example, until the electric current supplied to the motor 38 reaches a predetermined value. When the pressing force applied to the disk rotor D reaches a predetermined value, the ECU 70 stops the supply of electric current to the motor 38. Thereupon, in the ball-and-ramp mechanism 28, the rotation of the rotary ramp 29 stops, and, therefore, no thrust is applied to the rotary-rectilinear ramp 31 by the rolling action of the balls 32 between the ball grooves 29D and 31D. The rotary-rectilinear ramp 31 is subjected to a counterforce to the pressing force applied to the disk rotor D, which is transmitted through the piston 12 and the screw mechanism 52. In this regard, however, the rotary-rectilinear ramp 31 is in thread engagement with the base nut 33 through the external thread 31C and the internal thread 33C, which are irreversibly engaged with each other. Therefore, the rotary-rectilinear ramp 31 cannot rotate but is kept stopped, so that the piston 12 is held in the braking position. Thus, braking force is retained, and the operation of the parking brake is completed.

Next, when the parking brake is to be released, the parking switch 71 is actuated to perform a parking brake release operation. In response to the actuation of the parking switch 71, the ECU 70 drives the motor 38 to rotate in a direction for returning the piston 12, i.e. in a direction for moving the piston 12 away from the disk rotor D. Consequently, the spur wheel multistage speed reduction mechanism 37 and the planetary gear speed reduction mechanism 36 operate in the direction for returning the piston 12. At this time, there is no axial force acting on the rotary ramp 29. Therefore, the rotary ramp 29 cannot transmit rotational torque to the rotary-rectilinear ramp 31 until the balls 32 return to their initial positions between the ball grooves 29D and 31D of the rotary ramp 29 and the rotary-rectilinear ramp 31. Accordingly, only the rotary ramp 29 rotates at the initial stage of the parking brake release operation.

Figure 7A:
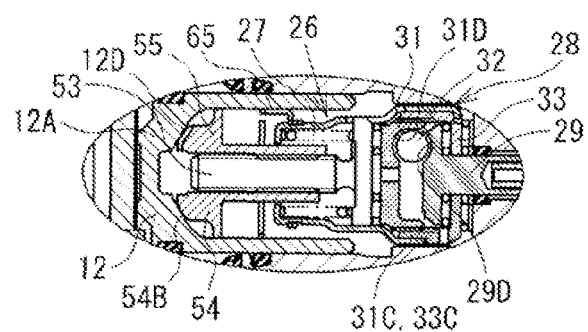
Figure 7B:
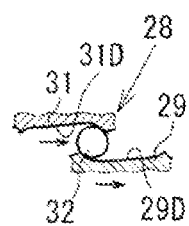
Figure 8A:
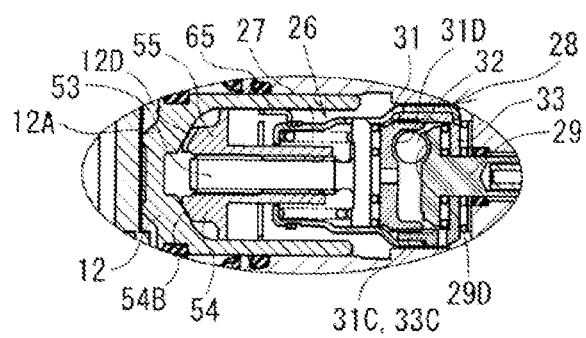
Figure 8B:
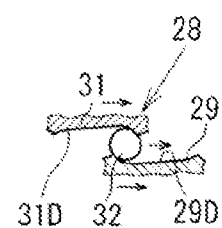

Next, when the balls 32 return to their initial positions between the ball grooves 29D and 31D of the rotary ramp 29 and the rotary-rectilinear ramp 31, as shown in FIG. 7B, as a result of the rotation of the rotary ramp 29, the rotary ramp 29, as shown in FIGS. 8A and 8B, starts to transmit rotational torque to the rotary-rectilinear ramp 31 through the balls 32.

At this middle stage of the parking brake release operation, the rotary ramp 29 cannot rotate the rotary-rectilinear ramp 31 because the counterforce to the pressing force applied to the disk rotor D is being applied to the nut 55. That is, rotational torque T4 required to cause relative rotation between the external thread 31C and the internal thread 33C, which are respective thread-engaging portions of the rotary-rectilinear ramp 31 and the base nut 33, is smaller than the total required torque T5+T3, which is the sum of rotational torque T5 required to rotate the thread-engaging portions 53C and 55C of the push rod 53 and the nut 55 and rotational resistance torque T3 applied by the spring clutch 65. Accordingly, the rotation of the rotary ramp 29 causes the rotary-rectilinear ramp 31, the retainer 26 and the push rod 53 to rotate together as one unit against the urging force of the spring clutch 65. Consequently, the push rod 53 and the nut 55 rotate relative to each other, and the nut 55 retracts away from the piston 12.

Figure 9A:
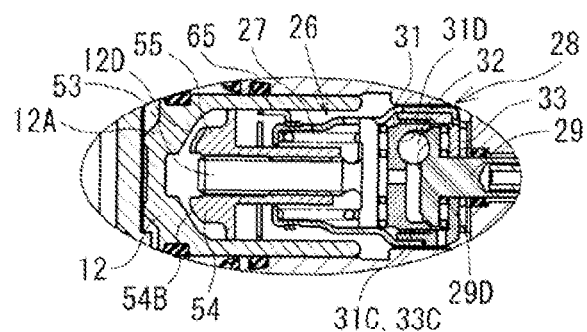
Figure 9B:
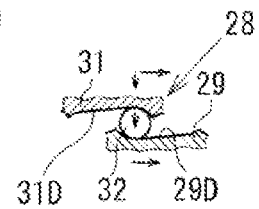

As the nut 55 retracts, the pressing force applied to the disk rotor D from the piston 12 decreases, and, eventually, the rotational torque T4 required to rotate the external thread 31C of the rotary-rectilinear ramp 31 and the internal thread 33C of the base nut 33 relative to each other becomes smaller than the rotational resistance torque T3 applied by the spring clutch 65. Consequently, the rotation of the retainer 26 stops, and, as shown in FIGS. 9A and 9B, the rotary-rectilinear ramp 31 retracts while rotating, together with the rotary ramp 29, relative to the base nut 33 to return to the initial position. Thus, the parking brake release operation is completed. The ECU 70 controls to stop the motor 38 based on the driving time of the motor 38 and the motor current supplied to the motor 38 to release the parking brake so that the nut 55 reaches the initial position at which the nut 55 is appropriately away from the piston 12.

It should be noted that, in this embodiment, rotational torque is transmitted from the rotary ramp 29 to the rotary-rectilinear ramp 31 through the balls 32. However, the present invention is not limited thereto. For example, the rotary ramp 29 and the rotary-rectilinear ramp 31 may be provided with projections (engaging members) that engage with each other when the rotary ramp 29 and the rotary-rectilinear ramp 31 reach the position shown in FIG. 4B to transmit rotational torque without passing through the balls 32. With this structure, the rotary ramp 29 directly rotates the rotary-rectilinear ramp 31 through the projections (engaging members). Consequently, durability of the balls 32 and the ball grooves 29D and 31D improves.

As has been stated above, the disk brake 1a according to the first embodiment offers the following advantageous effects. To propel and hold the piston 12 in the braking position as in the case of applying the parking brake, pressing force is applied to the disk rotor D from the inner and outer brake pads 2 and 3. At this time, it is possible to retain the pressing force applied to the disk rotor D while ensuring high operational efficiency for the piston holding mechanism 34 by combining the ball-and-ramp mechanism 28 of high mechanical efficiency with the screw mechanism 52 of low mechanical efficiency, which includes the thread-engaging portion 31C of the rotary-rectilinear ramp 31 and the thread-engaging portion 33C of the base nut 33. Thus, the structure of the disk brake 1a can be simplified as compared to the ratchet mechanism employed in the conventional disk brake, and the production efficiency of the disk brake 1a can be improved.

In the disk brake 1a according to the first embodiment, the piston 12 is subjected to not only pressing force from the external thread 31C and the internal thread 33C, which are respective thread-engaging portions of the rotary-rectilinear ramp 31 and the base nut 33, but also pressing force from the ball-and-ramp mechanism 28. Therefore, even if the motor 38 is downsized, desired braking force can be obtained. Further, if the motor 38 is downsized (reduced in torque), the torque applied to the spur wheel multistage speed reduction mechanism 37 and the planetary gear speed reduction mechanism 36 can also be reduced. Accordingly, downsizing of the motor 38 is advantageous in terms of operation noise and service life.

The disk brake 1a according to the first embodiment is improved in responsivity at the time of activating the parking brake by using the screw mechanism 52 including the push rod 53 and the nut 55, which is higher in rotary-to-rectilinear motion converting efficiency than the ball-and-ramp mechanism 28.

Although in this embodiment a combination of the spur wheel multistage speed reduction mechanism 37 and the planetary gear speed reduction mechanism 36 is employed as the speed reduction mechanism, it is also possible to employ other publicly known speed reduction mechanisms, such as a cycloidal speed reducer and a wave speed reducer. Further, although this embodiment employs the ball-and-ramp mechanism 28 having the balls 32 as rolling elements, it is also possible to employ a roller-and-ramp mechanism using circular cylindrical members excellent in load resistance.

Further, although in this embodiment the spring clutch 65 is employed as a member that applies rotational resistance torque to the retainer 26 when the pressing force applied to the disk rotor D is released, the arrangement may be such that the retainer 26 is provided with a collar as in the case of a publicly known disk brake caliper with a hand-operated brake, and the retainer 26 is restrained from axially moving relative to the cylinder 10 by a retaining ring through a washer or the like. If the arrangement is designed so that the coil spring 27 contracts after the retaining ring has been assembled, the urging force of the coil spring 27 is applied to the collar, the washer, and the retaining ring. Therefore, rotational resistance torque can be generated at this part of the disk brake 1a.

Further, although in this embodiment the operation of the piston holding mechanism 34 has been explained by way of the parking brake operation, which is one example of an operation for maintaining the vehicle in a stopped position, the piston holding mechanism 34, which is a parking brake mechanism, may be activated when the disk brake 1a is used to perform operations other than the parking brake operation, for example, a hill start assist operation or a hill down assist operation for assisting starting of the vehicle on a gradient, or an auto-stop operation, which is activated when the vehicle is in a stopped position with the accelerator off.

Next, a disk brake 1b according to a second embodiment of the present invention will be explained in detail with reference to FIGS. 10 to 13B. It should be noted that, in the following, only the points in which the disk brake 1b according to the second embodiment differs from the disk brake 1a according to the first embodiment will be explained. In the following explanation, members or portions of the disk brake 1b that are similar or equivalent to those of the disk brake 1a according to the first embodiment will be denoted by the same reference numerals as those in the first embodiment, and a detailed description thereof is omitted.

The disk brake 1b according to the second embodiment is constructed as follows. A cylinder 10 is provided therein with two members, i.e. an adjusting nut 101, and a push rod 100, which constitute a pad wear adjusting mechanism 90. The adjusting nut 101 is rotatably fitted in a piston 12 and has a friction surface 101A frictionally engaged with a tapered friction surface 12D formed on a bottom wall 12A of the piston 12. The adjusting nut 101 has the friction surface 101A pressed against the friction surface 12D of the piston 12 by a coned disk spring 102 through a thrust bearing 103. The distal end of the adjusting nut 101 is air-tightly fitted to the wall of a chamber 104 formed in the bottom 12A of the piston 12 such that the distal end of the adjusting nut 101 is movable in contact with the wall of the chamber 104. The chamber 104 is open to the atmosphere through a passage 105 and a dust boot 16.

The push rod 100 is thread-engaged at one end thereof with the adjusting nut 101. The other end of the push rod 100 is guided by a circular cylindrical retainer 108 movably in the axial direction of the cylinder 10. The push rod 100 is restrained by the retainer 108 from rotating about its own axis. The push rod 100 has a collar portion 100A. A coil spring 109 is disposed between the collar portion 100A and the retainer 108. The coil spring 109 applies its urging force toward the bottom wall 9 of the cylinder 10, thereby pressing the push rod 100 against a rotary-rectilinear ramp 111 of a ball-and-ramp mechanism 110 through a thrust washer 131. It should be noted that the retainer 108 is supported to the cylinder 10 by a retaining ring 125 so as to be restrained from axial movement.

The adjusting nut 101 and the push rod 100 are in thread engagement with each other through multiple-start threads. The adjusting nut 101 and the push rod 100 can convert rotary motion and motion in a rectilinear direction (hereinafter occasionally referred to as "rectilinear motion" for the sake of convenience) from one to the other therebetween. The multiple-start threads are provided with a predetermined built-in clearance so as to be rectilinearly movable relative to each other by a distance corresponding to the built-in clearance without rotating relative to each other. It should be noted that the urging force of the coil spring 109 is larger than that of the coned disk spring 102.

The ball-and-ramp mechanism 110 constitutes a part of a parking brake mechanism and has a rotary-rectilinear ramp 111 as an input member, a base cup 112, and a fixed ramp 113 as a follower member. The rotary-rectilinear ramp 111 is supported axially movably and rotatably about its own axis, which is constructed as a movable disk member. The base cup 112 is supported to the bottom wall 9 of the cylinder 10 by a pin 140 so as to be non-rotatable relative to the bottom wall 9. The fixed ramp 113 is supported non-rotatably relative to the base cup 112 and restrained from moving toward a second speed reduction gear 44. The base cup 112 and the fixed ramp 113 are constructed as a fixed disk member.

The base cup 112 is formed in the shape of a circular cylinder, one end of which is closed. That is, the base cup 112 has an annular bottom wall 112A and a circular cylindrical portion 112B extending from the outer peripheral edge of the bottom wall 112A. The bottom wall 112A is provided with a pin insertion hole 112C. A pin 140 projecting from the bottom wall 9 of the cylinder 10 is inserted in the pin insertion hole 112C. Thus, the base cup 112 is supported non-rotatably relative to the bottom wall 9, that is, the caliper body 6. In addition, the base cup 112 has an insertion hole 112D formed in the center of the bottom wall 112A. A circular column portion 120A of an input rod 120 (described later) is inserted in the insertion hole 112D.

The rotary-rectilinear ramp 111 has an annular rotary-rectilinear plate 111A and a circular cylindrical portion 111B extending from the inner peripheral edge of the rotary-rectilinear plate 111A. The cylindrical portion 111B has an internal thread 111C formed on the inner peripheral surface thereof as a first thread. The internal thread 111C is engaged with an external thread 120C of an input rod 120 (described later). The rotary-rectilinear plate 111A has a plurality of ball grooves 111D formed on a surface thereof that faces the fixed ramp 113.

The fixed ramp 113 is formed in an annular shape having an insertion hole 113A through which the cylindrical portion 111B of the rotary-rectilinear ramp 111 is inserted. The fixed ramp 113 is non-rotatably supported at the outer peripheral edge thereof by the distal end of the cylindrical portion 112B of the base cup 112. The fixed ramp 113 has a plurality of ball grooves 113D formed on a surface thereof that faces the rotary-rectilinear plate 111A of the rotary-rectilinear ramp 111. Balls 115 are each interposed between a pair of mutually opposing ball grooves 111D and 113D of the rotary-rectilinear plate 111A of the rotary-rectilinear ramp 111 and the fixed ramp 113. The balls 115 are steel balls. In the ball-and-ramp mechanism 110 arranged as stated above, when the rotary-rectilinear ramp 111 is rotated, the balls 115 roll between the ball grooves 111D and 113D of the rotary-rectilinear ramp 111 and the fixed ramp 113, thereby allowing the rotary-rectilinear ramp 111 to move axially while rotating.

The input rod 120 has a circular column portion 120A, a collar portion 120B, and an external thread 120C as a second thread. The column portion 120A extends through the insertion hole 112D in the bottom wall 112A of the base cup 112 and through the hole 9A in the bottom wall 9 of the cylinder 10. The collar portion 120B is integrally connected to one end of the column portion 120A. The collar portion 120B has a larger diameter than the column portion 120A. The external thread 120C is provided to extend from the collar portion 120B away from the column portion 120A to engage with the internal thread 111C of the cylindrical portion 111B of the rotary-rectilinear ramp 111. The other end of the column portion 120A is provided with a polygonal hole 120D in which a polygonal column 48A of the carrier 48 is fitted. The input rod 120 has the collar portion 120B disposed to face the bottom wall 112A of the base cup 112 across a thrust bearing 122, thereby the input rod 120 being supported rotatably relative to the caliper body 6. In addition, the internal thread 111C and the external thread 120C, which are respective thread-engaging portions of the rotary-rectilinear ramp 111 and the input rod 120, are set so that the input rod 120 cannot be rotated by an axial load (counterforce to the pressing force) applied from the piston 12 to the rotary-rectilinear ramp 111, i.e. so that the reverse efficiency of the internal and external threads 111C and 120C is not more than 0. In other words, the internal and external threads 111C and 120C are configured to exhibit large irreversibility. In this embodiment, the internal thread 111C and the external thread 120C constitute a screw mechanism which is a part of a parking brake mechanism.

Next, the operation of the disk brake 1b according to the second embodiment will be explained. In the following also, only the points in which the operation of the disk brake 1b differs from that of the disk brake 1a according to the first embodiment will be explained. The following is an explanation of an operation of the disk brake 1b according to the second embodiment when used as a parking brake, which is an example of an operation for maintaining the vehicle in a stopped position.

Figure 10:
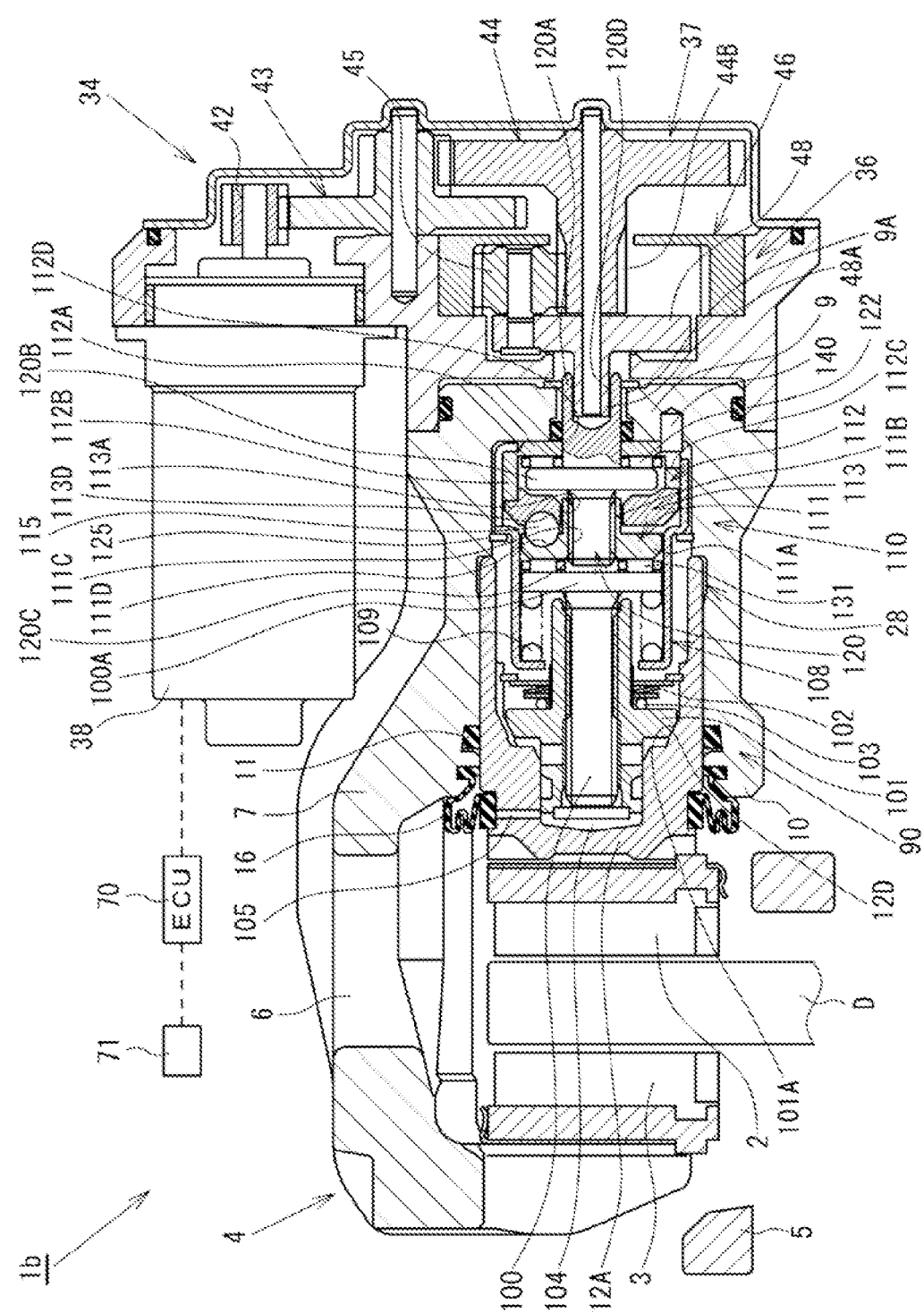
FIG. 10 is a sectional view of a disk brake according to a second embodiment of the present invention.

FIGS. 10, 11A and 11B show the disk brake 1b when the parking brake is in a released position. To activate the parking brake in this state, the ECU 70 drives the motor 38 to rotate the input rod 120. Consequently, as shown in FIGS. 12A and 12B, the rotary-rectilinear ramp 111 moves axially while rotating until both rotational torque T11 generated at the thread-engaging portions 111C and 120C of the cylindrical portion 111B of the rotary-rectilinear ramp 111 and the input rod 120 and rotational torque T12 generated when the ball 115 roll between the ball grooves 111D and 113D of the rotary-rectilinear ramp 111 and the fixed ramp 113 balance with rotational torque input from the motor 38. At this time, the push rod 100 is subjected to force that is the sum of thrust generated at the thread-engaging portions 111C and 120C of the rotary-rectilinear ramp 111 and the input rod 120 and thrust generated when the ball 115 roll between the ball grooves 111D and 113D of the rotary-rectilinear ramp 111 and the fixed ramp 113.

After the electric current supplied to the motor 38 has reached a value corresponding to a desired pressing force to be applied to the disk rotor D from the piston 12, the ECU 70 stops the supply of electric current to the motor 38. The rotary-rectilinear ramp 111 is subjected to a counterforce to the pressing force applied to the disk rotor D, which is transmitted through the piston 12 and the pad wear adjusting mechanism 90. Accordingly, the rotary-rectilinear ramp 111 is urged to reverse by the rolling action of the ball 115 between the ball grooves 111D and 113D of the rotary-rectilinear ramp 111 and the fixed ramp 113. However, the threads 111C and 120C of the rotary-rectilinear ramp 111 and the input rod 120 are irreversibly engaged with each other. Therefore, the rotary-rectilinear ramp 111 cannot rotate relative to the input rod 120. Thus, the braking force is retained. That is, the piston 12 is held in the braking position.

Figure 13A:
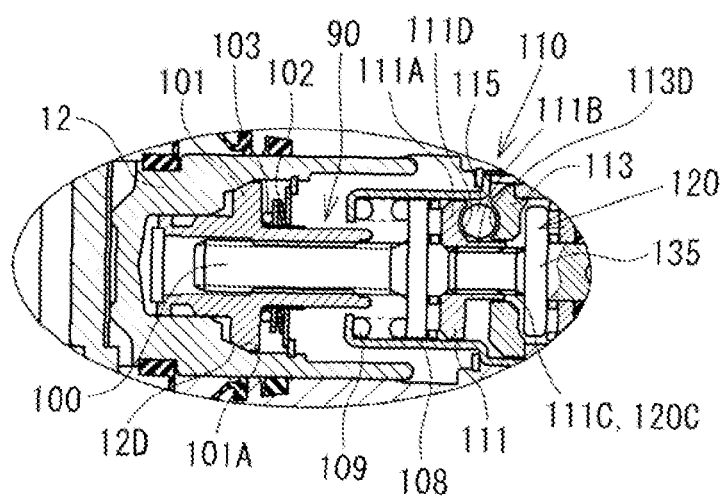
Figure 13B:
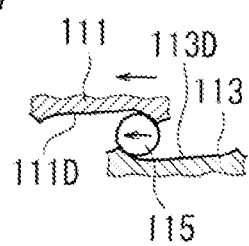

To release the parking brake, as shown in FIGS. 13A and 13B, the ECU 70 rotates the motor 38 in reverse so that the rotary-rectilinear ramp 111 returns to the initial position (shown in FIGS. 11A and 11B) in the rotational direction relative to the fixed ramp 113. When the rotary-rectilinear ramp 111 is restrained from moving in the rotational direction relative to the fixed ramp 113 after rotating in the reverse direction, the rotary-rectilinear ramp 111 and the input rod 120 rotate relative to each other, and the rotary-rectilinear ramp 111 returns axially to the position shown in FIGS. 11A and 11B. Thus, the release of the parking brake is completed.

As has been stated above, according to the disk brake 1b of the second embodiment, the pad wear adjusting mechanism 90 is not activated by the motor 38. Therefore, it becomes easy to control the motor 38 from starting to stopping reverse rotation of the motor 38 when the parking brake is to be released.

Next, a disk brake 1c according to a third embodiment of the present invention will be explained in detail with reference to FIGS. 14 to 24C. It should be noted that, in the following, only the points in which the disk brake 1c according to the third embodiment differs from the disk brake 1a according to the first embodiment will be explained. In the following explanation, members or portions of the disk brake 1c that are similar or equivalent to those of the disk brake 1a according to the first embodiment will be denoted by the same reference numerals as those in the first embodiment, and a detailed description thereof is omitted.

Figure 14:
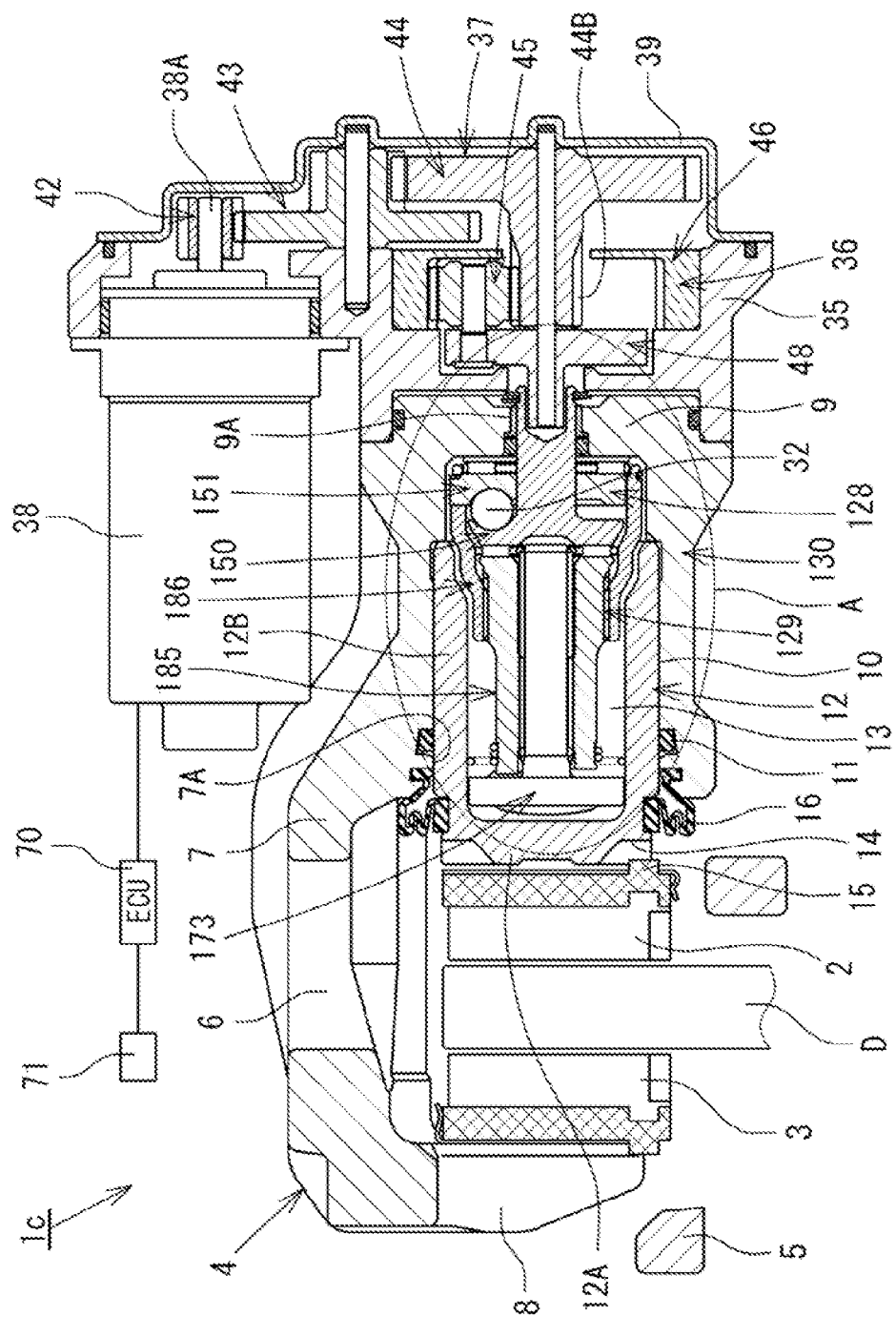
FIG. 14 is a sectional view of a disk brake according to a third embodiment of the present invention.

In the disk brake 1c according to the third embodiment, as shown in FIG. 14, a caliper body 6 is equipped with a piston holding mechanism 130 as a parking brake mechanism that propels and holds a piston 12 in a braking position. Further, the caliper body 6 is equipped with a spur wheel multistage speed reduction mechanism 37 and a planetary gear speed reduction mechanism 36, which constitute a speed reduction mechanism that increases the force of rotation from a motor 38.

The piston holding mechanism 130 has a ball-and-ramp mechanism 128 that converts rotary motion from the spur wheel multistage speed reduction mechanism 37 and the planetary gear speed reduction mechanism 36 into motion in a rectilinear direction (hereinafter referred to as "rectilinear motion" for the sake of convenience) and that applies thrust to the piston 12. The piston holding mechanism 130 further has a push rod 173 forming a part of a pressing member caused to press the piston 12 by the action of the ball-and-ramp mechanism 128 and serving as an abutting member, and a screw mechanism 129 disposed between the push rod 173 and a bottom wall 9 of a cylinder 10, i.e. between the push rod 173 and the ball-and-ramp mechanism 128, to serve as a thrust retaining mechanisms that holds the piston 12 in the braking position. The ball-and-ramp mechanism 128, the push rod 173, and the screw mechanism 129 are accommodated in the cylinder 10 of the caliper body 6.

Figure 15:
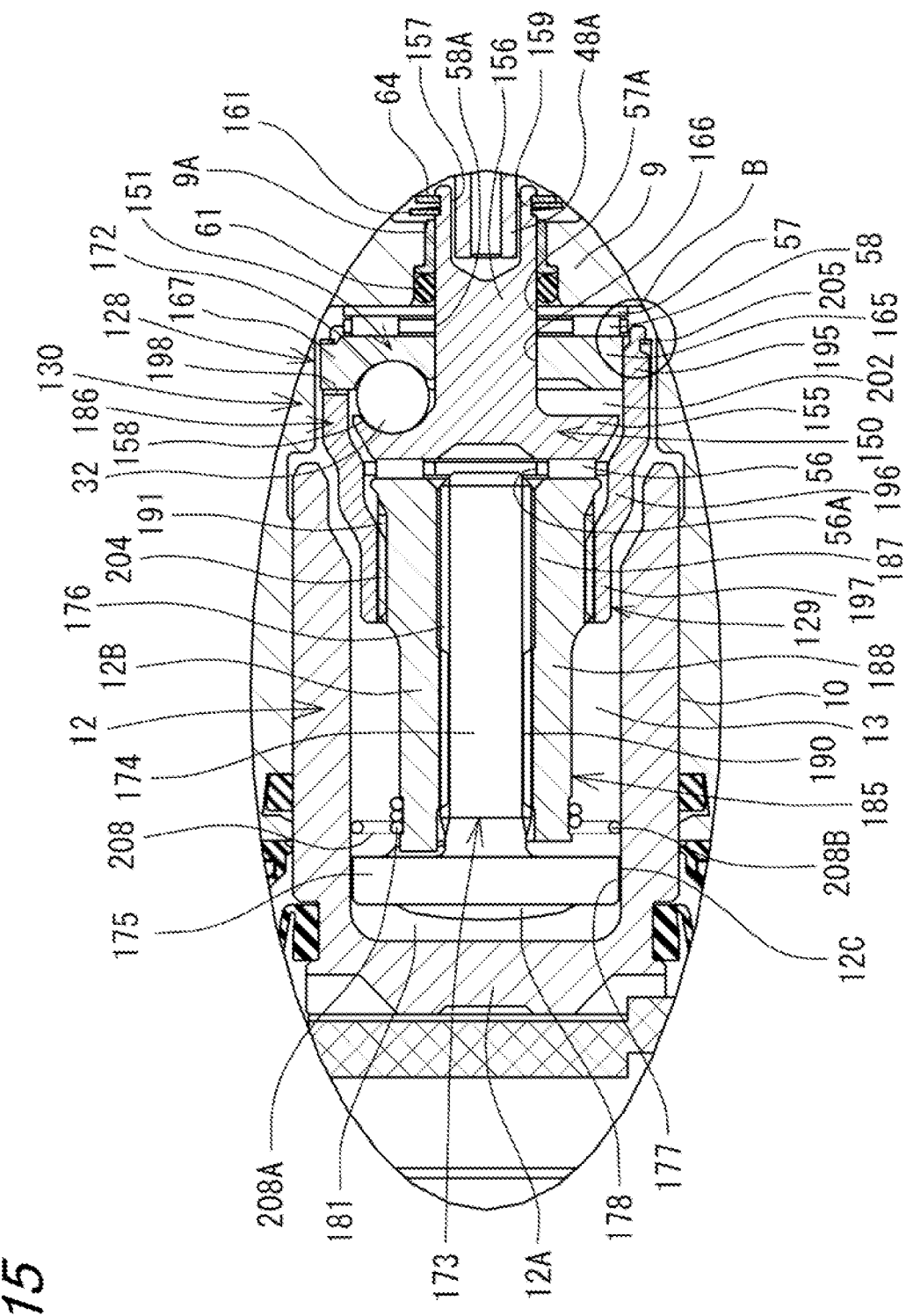
FIG. 15 is an enlarged view of part A in FIG. 14.

As shown in FIG. 15, a polygonal column 48A of a carrier 48 is fitted into a polygonal hole 157 provided in a circular column portion 156 of a rotary-rectilinear ramp 150 of the ball-and-ramp mechanism 128 (described later), thereby enabling the carrier 48 and the rotary-rectilinear ramp 150 to transmit rotational torque to each other.

Figure 17:
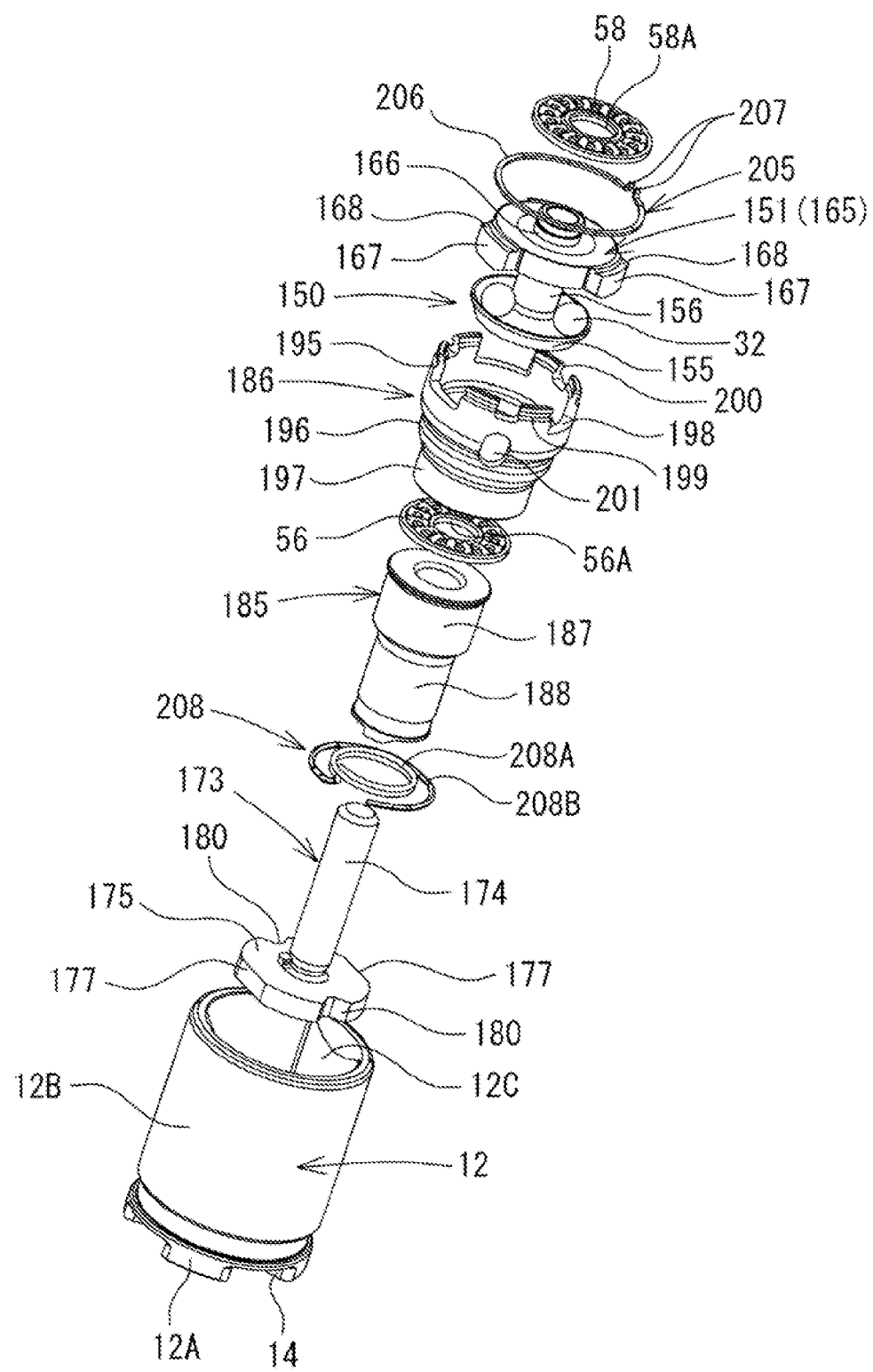
FIG. 17 is an exploded perspective view of a main part of the disk brake according to the third embodiment.

The ball-and-ramp mechanism 128 has, as shown in FIGS. 15 and 17, a rotary-rectilinear ramp 150 as an input member, a rotary ramp 151 as a follower member, and a plurality of balls 32 interposed between the rotary-rectilinear ramp 150 and the rotary ramp 151.

The rotary-rectilinear ramp 150 has an integral structure comprising a disk-shaped rotary-rectilinear plate 155 and a circular column portion 156 extending substantially from the diametrical center of the rotary-rectilinear plate 155. Thus, the rotary-rectilinear ramp 150 has a T-shape in axial sectional view. The column portion 156 extends through an insertion hole 166 provided substantially in the diametrical center of a rotary plate 165 of the rotary ramp 151 and through a through-hole 58A in a thrust bearing 58, a through-hole 57A in a thrust washer 57, and a hole 9A provided in the bottom wall 9 of the cylinder 10. The distal end of the column portion 156 is provided with a polygonal hole 157 that is fitted with the polygonal column 48A provided on the carrier 48. The surface of the rotary-rectilinear plate 155 on a side thereof closer to the column portion 156 has a plurality (three in this embodiment) of ball grooves 158 arcuately extending along the circumferential direction with a predetermined angle of inclination and having an arcuate cross-section in the diametrical direction. A seal 61 is provided between the hole 9A in the bottom wall 9 of the cylinder 10 and the outer peripheral surface of the column portion 156 of the rotary-rectilinear ramp 150 to maintain the liquid-tightness of a hydraulic chamber 13. The rotary-rectilinear ramp 150 has an annular groove 159 formed on the outer peripheral surface at the distal end of the column portion 156. A wave washer 161 and a retaining ring 64 are fitted in the annular groove 159 to allow axial movement of the rotary-rectilinear ramp 150 toward inner and outer brake pads 2 and 3 in response to an operation of the parking brake.

As shown in FIGS. 15 to 17, the rotary ramp 151 is formed by a rotary plate 165 having an insertion hole 166 substantially in the diametrical center thereof. The rotary plate 165 has a plurality of circumferentially spaced fitting projections 167 formed on the outer periphery thereof. The fitting projections 167 have fitting stepped surfaces 168 formed on upper sides thereof at positions slightly lower than the respective upper sides. A wave clip 205 (described later) is placed on the fitting stepped surfaces 168. It should be noted that the outer diameter of the rotary plate 165, including the fitting projections 167, is larger than the outer diameter of the rotary-rectilinear plate 155 of the rotary-rectilinear ramp 150. The rotary plate 165 is rotatably supported to the bottom wall 9 of the cylinder 10 through a thrust washer 57 and a thrust bearing 58. A surface of the rotary plate 165 that faces the rotary-rectilinear plate 155 of the rotary-rectilinear ramp 150 has a plurality (three in this embodiment) of ball grooves 172 arcuately extending along the circumferential direction with a predetermined angle of inclination and having an arcuate cross-section in the diametrical direction.

The balls 32 are each interposed between one ball groove 158 of the rotary-rectilinear plate 155 of the rotary-rectilinear ramp 150 and one ball groove 172 of the rotary plate 165 of the rotary ramp 151. When rotational torque is applied to the rotary-rectilinear ramp 150, the balls 32 roll between the ball grooves 158 and 172 of the rotary-rectilinear plate 155 and the rotary plate 165, resulting in a rotation difference between the rotary-rectilinear plate 155 and the rotary plate 165, i.e. between the rotary-rectilinear ramp 150 and the rotary ramp 151. Consequently, an axial relative distance between the rotary-rectilinear plate 155 and the rotary plate 165 varies.

As shown in FIGS. 15 to 17, the push rod 173 comprises a shaft portion 174 and a disk-shaped flange portion 175 integrally connected to one end of the shaft portion 174 closer to the inner and outer brake pads 2 and 3. Thus, the push rod 173 has a T-shape in axial sectional view. The shaft portion 174 has an external thread 176 as an abutting member thread formed thereon to extend substantially from the axial center to the distal end of the shaft portion 174. The external thread 176 is engaged with an internal thread 190 (third thread) provided on the inner peripheral surface of an adjuster nut 185 (described later). The distal end of the shaft portion 174 extends into a through-hole 56A of a thrust bearing 56 to face substantially the diametrical center of the rotary-rectilinear ramp 150 of the ball-and-ramp mechanism 128. The flange portion 175 of the push rod 173 has an outer diameter substantially equal to the inner diameter of the piston 12 and is disposed to face the bottom wall 12A of the piston 12. The flange portion 175 has a plurality of circumferentially spaced planar portions 177 formed on the outer periphery thereof. The planar portions 177 are respectively engaged with a plurality of circumferentially spaced axially extending planar portions 12C formed on the inner peripheral surface of a circular cylindrical portion 12B of the piston 12. The engagement between the planar portions 177 and 12C allows the push rod 173 to move axially relative to the piston 12 but restrains the push rod 173 from moving in the direction of rotation. In addition, the flange portion 175 of the push rod 173 has a spherical projection 178 projecting substantially from the diametrical center thereof toward the bottom wall 12A of the piston 12. When the push rod 173 advances, the spherical projection 178 of the flange portion 175 abuts against the bottom wall 12A of the piston 12. In addition, the flange portion 175 of the push rod 173 has grooves 180 formed on the outer periphery thereof. The grooves 180 are each located between a pair of mutually adjacent planar portions 177. The grooves 180 allow a space 181 surrounded by the bottom wall 12A of the piston 12 and the flange portion 175 of the push rod 173 to communicate with the hydraulic chamber 13, thereby enabling circulation of brake fluid, and ensuring air bleedability for the space 181.

The screw mechanism 129 is constructed as a thrust retaining mechanism holding the piston 12 in the braking position. The screw mechanism 129 comprises an adjuster nut 185 provided between the push rod 173 and the ball-and-ramp mechanism 128 to serve as a screw member or a connecting member, and a base nut 186. More specifically, the screw mechanism 129 comprises a thread engagement between an external thread 191 of the adjuster nut 185 as a second thread and an internal thread 204 of the base nut 186 as a first thread, and a thread engagement between an internal thread 190 of the adjuster nut 185 as a third thread and an external thread 176 of the push rod 173 as an abutting member thread.

As shown in FIGS. 15 to 17, the adjuster nut 185 comprises a large-diameter cylindrical portion 187 having an external thread 191 on the outer peripheral surface thereof and a small-diameter cylindrical portion 188 extending from the large-diameter cylindrical portion 187 toward the inner and outer brake pads 2 and 3. The adjuster nut 185 has an internal thread 190 formed on the inner peripheral surface thereof over the entire axial length thereof. The internal thread 190 is engaged with the external thread 176 of the push rod 173. The large-diameter cylindrical portion 187 of the adjuster nut 185, which is located on the side thereof closer to the ball-and-ramp mechanism 128, has an external thread 191 formed on the outer peripheral surface. The external thread 191 is engaged with an internal thread 204 provided on the inner peripheral surface of a small-diameter cylindrical portion 197 of the base nut 186 (described later). The end of the large-diameter cylindrical portion 187 of the adjuster nut 185 on the side thereof closer to the ball-and-ramp mechanism 128 is disposed to axially face the rotary-rectilinear ramp 150 across a thrust bearing 56. The thread engagement between the external thread 176 of the push rod 173 and the internal thread 190 of the adjuster nut 185 is set so that the reverse efficiency is not more than 0, i.e. so as to exhibit large irreversibility, in order to prevent the adjuster nut 185 from being rotated in the retracting direction by an axial load applied from the piston 12 to the rotary-rectilinear ramp 150.

As shown in FIGS. 15 to 17, the base nut 186 as a cylindrical member comprises a large-diameter cylindrical portion 195, a multi-step cylindrical portion 196 extending contiguously from the large-diameter cylindrical portion 195 toward the inner and outer brake pads 2 and 3 while being reduced in diameter stepwise, and a small-diameter cylindrical portion 197 extending contiguously from the multi-step cylindrical portion 196 toward the inner and outer brake pads 2 and 3. The outer diameter of the large-diameter cylindrical portion 195 is substantially the same as the outer diameter of the rotary plate 165 of the rotary ramp 151 (the outer diameter including the fitting projections 167). The large-diameter cylindrical portion 195 has a plurality of circumferentially spaced fitting recesses 198 formed on the peripheral wall thereof. The fitting recesses 198 are each open at one axial end thereof so that the fitting projections 167 provided on the rotary plate 165 of the rotary ramp 151 are fitted into the fitting recesses 198. The large-diameter cylindrical portion 195 has a clearance-fit groove 199 circumferentially formed on the peripheral wall surface thereof, excluding the fitting recesses 198. A wave clip 205 (described later) is clearance-fitted into the groove 199. The large-diameter cylindrical portion 195 has accommodating grooves 200 formed on the peripheral wall thereof, each accommodating groove 200 being provided between a pair of mutually adjacent fitting recesses 198. The accommodating grooves 200 accommodate hook portions 207 provided at the opposite ends of the wave clip 205. The accommodating grooves 200 are each open at one end thereof. The multi-step cylindrical portion 196 has a plurality of circumferentially spaced communicating holes 201 formed in the peripheral wall thereof. The communicating holes 201 allow a space 202 inside the base nut 186 to communicate with the hydraulic chamber 13. Thus, brake fluid can circulate between the space 202 and the hydraulic chamber 13, and it is possible to ensure air bleedability for the space 202. The small-diameter cylindrical portion 197 has an internal thread 204 formed on the inner peripheral surface thereof. The internal thread 204 is engaged with the external thread 191 provided on the outer peripheral surface of the adjuster nut 185.

It should be noted that the thread engagement between the external thread 191 of the adjuster nut 185 and the internal thread 204 of the base nut 186 is set so that the reverse efficiency is not more than 0, i.e. so as to exhibit large irreversibility, in order to prevent the base nut 186 from being rotated in the retracting direction by an axial load applied from the piston 12 to the rotary-rectilinear ramp 150.

Figure 18A:
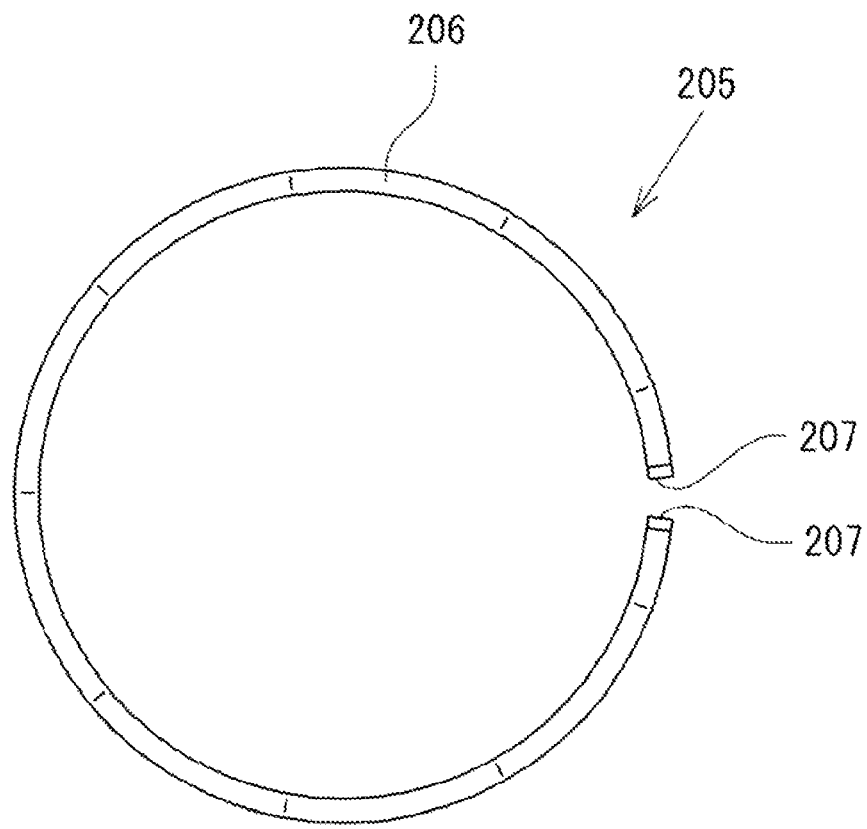
FIGS. 18A and 18B are a plan view and a side view, respectively, showing a wave clip employed in the disk brake according to the third embodiment.
Figure 18B:
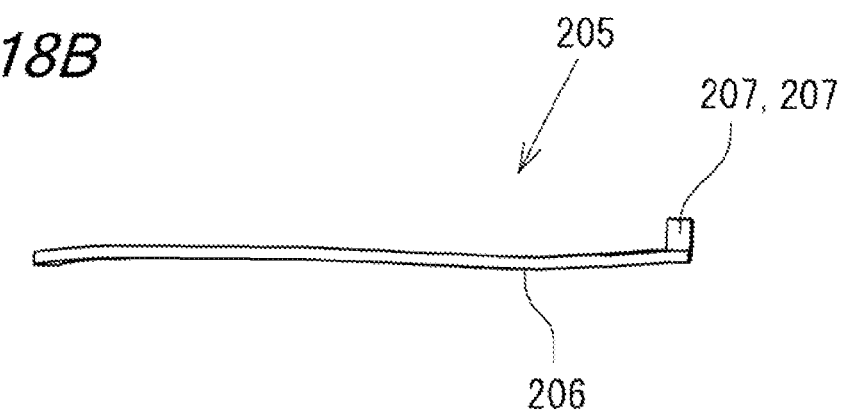

The wave clip 205 connects the base nut 186 and the rotary plate 165 of the rotary ramp 151. As shown in FIGS. 18A and 18B, the wave clip 205 comprises a flat thin plate-shaped member 206 extending circumferentially and hook portions 207 provided at the opposite ends of the thin plate-shaped member 206. The thin plate-shaped member 206 is wavy. The opposite ends of the thin plate-shaped member 206 are bent to extend perpendicular to the rest of the thin plate-shaped member 206 so as to face each other, thereby forming the hook portions 207.

Figure 16A:
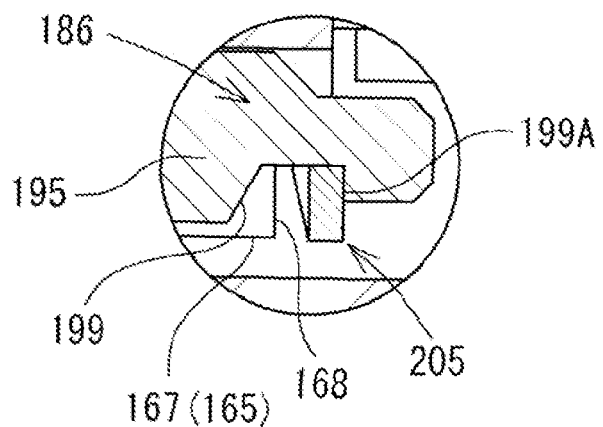
FIGS. 16A to 16C are enlarged views of part B in FIG. 15.
Figure 16B:
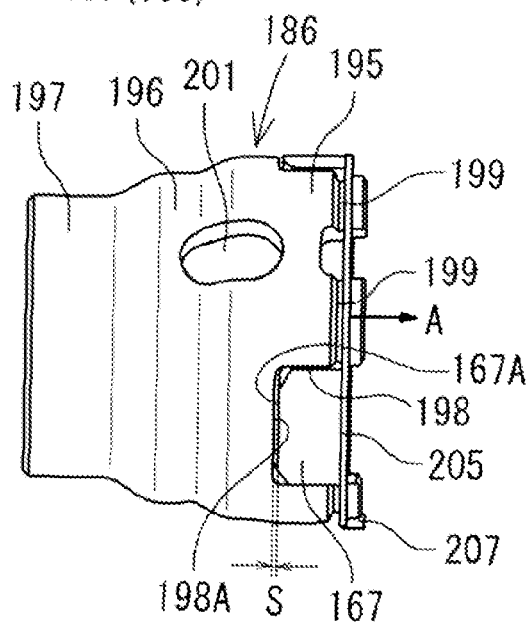
Figure 16C:
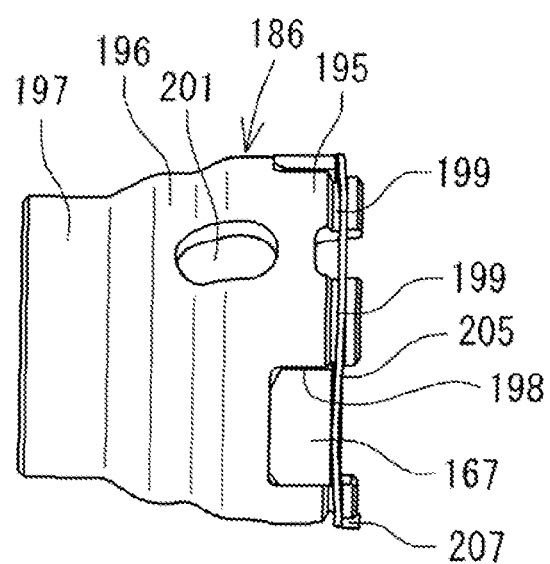

As shown in FIGS. 15 to 17, the rotary plate 165 of the rotary ramp 151 is inserted into the large-diameter cylindrical portion 195 of the base nut 186, and the fitting projections 167 of the rotary plate 165 are respectively fitted into the fitting recesses 198 of the base nut 186. Thereafter, the wave clip 205 is interposed between the fitting stepped surfaces 168 of the fitting projections 167 of the rotary plate 165, on the one hand, and, on the other, one of the mutually opposing surfaces, i.e. surface 199A, of the clearance-fit groove 199 of the base nut 186, and the hook portions 207 of the wave clip 205 are accommodated in the accommodating grooves 200 provided on the large-diameter cylindrical portion 195 of the base nut 186. By the urging force of the wave clip 205, the base nut 186 is, as shown in FIG. 16B, urged toward the bottom wall 9 of the cylinder 10 (in the direction of arrow A) when the ball-and-ramp mechanism 128 is inoperative. In this state, a gap S is formed between the respective axially facing surfaces 167A and 198A of each fitting projection 167 of the rotary plate 165 and the corresponding fitting recess 198 of the base nut 186. Thus, the wave clip 205 urges the base nut 186 toward the bottom wall 9 of the cylinder 10 relative to the rotary ramp 151, thereby urging the rotary-rectilinear ramp 150 toward the rotary ramp 151 through the adjuster nut 185. In other words, the wave clip 205 allows the balls 32 to be retained by being held between the rotary-rectilinear ramp 150 and the rotary ramp 151. Accordingly, the wave clip 205 allows the axial size of the parking brake mechanism to be shortened as compared to the coil spring 27 in the first embodiment and the coil spring 109 in the second embodiment, which have a similar function to that of the wave clip 205. It should be noted that the base nut 186 is non-rotatable relative to the rotary plate 165 of the rotary ramp 151 but axially movable (see FIG. 16C) toward the bottom wall 9 of the cylinder 10 by a distance corresponding to the gap S (see FIG. 16B) between the respective axially facing surfaces 167A and 198A of each fitting projection 167 of the rotary plate 165 and the corresponding fitting recess 198 of the base nut 186 when the ball-and-ramp mechanism 128 is operative. Further, the wave clip 205 is restrained from rotating relative to the base nut 186 (rotary plate 165) because the hook portions 207 of the wave clip 205 are accommodated in the accommodating grooves 200 of the base nut 186.

The balls 32 are interposed between the ball grooves 158 of the rotary-rectilinear plate 155, on the one hand, and, on the other, the ball grooves 172 of the rotary plate 165, and the column portion 156 of the rotary-rectilinear ramp 150 is inserted through the insertion hole 166 of the rotary plate 165 of the rotary ramp 151, the through-hole 58A of the thrust bearing 58, the through-hole 57A of the thrust washer 57, and the hole 9A of the bottom wall 9 of the cylinder 10. Thus, the rotary plate 165 of the rotary ramp 151 is rotatably supported to the bottom wall 9 of the cylinder 10 by the thrust bearing 58. As has been stated above, the rotary plate 165 of the rotary ramp 151 and the base nut 186 are connected by the wave clip 205. In addition, the adjuster nut 185 is rotatably supported to the rotary-rectilinear plate 155 of the rotary-rectilinear ramp 150 through the thrust bearing 56, and the external thread 191 (second thread) provided on the outer peripheral surface of the adjuster nut 185 is engaged with the internal thread 204 (first thread) provided on the inner peripheral surface of the small-diameter cylindrical portion 197 of the base nut 186. Further, the internal thread 190 (third thread) provided on the inner peripheral surface of the adjuster nut 185 is engaged with the external thread 176 (abutting member thread) provided on the outer peripheral surface of the shaft portion 174 of the push rod 173.

The external thread 191 of the adjuster nut 185 and the internal thread 204 of the base nut 186 are configured as follows. When the rotary-rectilinear ramp 150 is moved away from the rotary ramp 151 by the rolling action of the balls 32 between the mutually opposing ball grooves 158 and 172 of the rotary-rectilinear ramp 150 and the rotary ramp 151 in response to rotating the rotary-rectilinear ramp 150 in one direction, the external thread 191 and the internal thread 204 rotate relative to each other so that the adjuster nut 185 moves away from the base nut 186 when the rotary ramp 151 rotates in the same direction as the rotary-rectilinear ramp 150 with a rotation difference therebetween. That is, because the rotary ramp 151 is in thread engagement with the adjuster nut 185 through the base nut 186, when the adjuster nut 185 is not rotating relative to the cylinder 10, the rotary-rectilinear ramp 150 is propelled in the axial direction by the rolling action of the balls 32, together with the adjuster nut 185, with a rotation difference between the rotary-rectilinear ramp 150 and the rotary ramp 151. At the same time, the adjuster nut 185 is also propelled in the axial direction by the relative rotation of the external thread 191 thereof and the internal thread 204 of the base nut 186. Thus, the base nut 186 rotates until balance is achieved between rotational torque of the rotary ramp 151 generated by the rolling action of the balls 32 and rotational resistance torque generated in the thread engagement between the external thread 191 of the adjuster nut 185 and the internal thread 204 of the base nut 186.

The small-diameter cylindrical portion 188 of the adjuster nut 185 has a coil 208A of a spring clutch 208 wound on the outer periphery of an end of the cylindrical portion 188 closer to the inner and outer brake pads 2 and 3. The spring clutch 208 serves as a one-way clutch member. The spring clutch 208 is configured to apply rotational torque to the adjuster nut 185 when urged to rotate in one direction but to apply substantially no rotational torque to the adjuster nut 185 when rotating in the other direction. In this embodiment, the spring clutch 208 applies rotational resistance torque in the direction of rotation of the adjuster nut 185 when moving toward the ball-and-ramp mechanism 128. It should be noted that the magnitude of rotational resistance torque applied by the spring clutch 208 is larger than the rotational resistance torque generated in the thread engagement between the external thread 191 of the adjuster nut 185 and the internal thread 204 of the base nut 186 by the urging force of the wave clip 205 when the adjuster nut 185 moves in the retracting direction relative to the base nut 186. In addition, the spring clutch 208 has a ring portion 208B formed on the distal end (left-hand end in FIG. 15) thereof. The ring portion 208B abuts against the planar portions 12C of the piston 12 in the same way as the planar portions 177 of the flange portion 175 of the push rod 173. Thus, the spring clutch 208 is axially movable relative to the piston 12 but restrained from moving in the direction of rotation.

Next, the operation of the disk brake 1c according to the third embodiment when used as a parking brake will be explained with reference to FIGS. 19A to 24C and also reference to FIGS. 14, 16A, 16B and 16C. FIGS. 14, 16B and 19A to 19C show the disk brake 1c when the parking brake is in a released position. FIGS. 19A to 21C show, step by step, an operation taking place to activate the parking brake. FIGS. 22A to 24C show, step by step, an operation taking place to release the parking brake. When the parking switch 71 is actuated to activate the parking brake from the released position, the ECU 70 drives the motor 38 to rotate the sun gear 44B of the planetary gear speed reduction mechanism 36 through the spur wheel multistage speed reduction mechanism 37. The rotation of the sun gear 44B causes the carrier 48 to rotate through the planetary gears 45. The rotational force of the carrier 48 is transmitted to the rotary-rectilinear ramp 150.

As shown in FIGS. 19A to 19C, when the parking brake is in the released position, the base nut 186 and the rotary ramp 151 are separate from each other as a result of the internal thread 204 of the base nut 186 advancing along the external thread 191 of the adjuster nut 185, and the rotary-rectilinear ramp 150 is being pressed toward the rotary ramp 151 by the urging force of the wave clip 205 through the thread engagement between the internal thread 204 of the base nut 186 and the external thread 191 of the adjuster nut 185 and through the thrust bearing 56. Therefore, in order for the rotary-rectilinear ramp 150 to advance (move leftward in FIG. 14) relative to the caliper body 6, a thrust larger than a certain value, i.e. rotational torque T1, is required. Meanwhile, when either of the inner and outer brake pads 2 and 3 and the disk rotor D are not in abutment with each other and there is no pressing force to the disk rotor D from the piston 12, rotational torque T2 required to cause relative rotation between the external thread 191 of the adjuster nut 185 and the internal thread 204 of the base nut 186 is sufficiently smaller than the rotational torque T1 required to advance the rotary-rectilinear ramp 150. Further, when the parking brake is activated, rotational resistance torque T3 is not applied by the spring clutch 208, either.

Accordingly, the rotary-rectilinear ramp 150 cannot advance at the beginning of the transmission of rotational force from the carrier 48 to the rotary-rectilinear ramp 150. Therefore, as shown in FIGS. 20A and 20C, the rotary ramp 151 starts to rotate together with the rotary-rectilinear ramp 150. Almost all of the rotational force, except a mechanical loss, is transmitted from the rotary-rectilinear ramp 150 to the screw mechanism 129, which comprises the thread engagement between the internal thread 204 of the base nut 186 and the external thread 191 of the adjuster nut 185. Thus, the rotational force of the carrier 48 causes the rotary-rectilinear ramp 150, the rotary ramp 151, the base nut 186, and the adjuster nut 185 to rotate together as one unit. As shown in FIGS. 20A to 20C, the rotation of the adjuster nut 185 causes relative rotation between the internal thread 190 (third thread) of the adjuster nut 185 and the external thread 176 (abutting member thread) of the push rod 173, which constitute the screw mechanism 129. This, in turn, causes the push rod 173 to advance (move leftward in FIG. 14). Consequently, the spherical projection 178 of the flange portion 175 of the push rod 173 abuts against the bottom wall 12A of the piston 12, causing the piston 12 to advance. Still in this state, as shown in FIG. 20C, the gap S is ensured between the respective axially facing surfaces 198A and 167A of each fitting recess 198 of the base nut 186 and the corresponding fitting projection 167 of the rotary ramp 151 (state shown in FIG. 16B).

When the motor 38 is further driven from the state shown in FIGS. 20A to 20C, the push rod 173 moves, and consequently, the piston 12 starts to press the disk rotor D through the brake pads 2 and 3. When pressing force against the disk rotor D starts to be generated, as shown in FIGS. 21A to 21C, rotational resistance increases in the thread engagement between the external thread 176 of the push rod 173 and the internal thread 190 of the adjuster nut 185 due to axial force, which is a counterforce to the pressing force. Consequently, the rotational torque T2 required to advance the push rod 173 increases. Eventually, the required rotational torque T2 becomes larger than the rotational torque T1 required to activate the ball-and-ramp mechanism 128, i.e. to advance the rotary-rectilinear ramp 150. As a result, the rotation of the adjuster nut 185 stops. Consequently, the rotary-rectilinear ramp 150 advances while rotating, and the rotary ramp 151 rotates with a rotation difference between itself and the rotary-rectilinear ramp 150. Accordingly, the internal thread 204 of the base nut 186 and the external thread 191 of the adjuster nut 185 move relative to each other, causing the adjuster nut 185 to advance in the axial direction. The axial advancement of the adjuster nut 185 causes the piston 12 to advance through the push rod 173, resulting in an increase of the pressing force applied to the disk rotor D by the piston 12. At the same time, rotational torque is also transmitted to the rotary ramp 151 from the rotary-rectilinear ramp 150 through the balls 32. Accordingly, the rotary ramp 151 rotates until balance is achieved between rotational torque of the rotary ramp 151 and rotational resistance torque generated in the thread engagement between the internal thread 204 of the base nut 186 and the external thread 191 of the adjuster nut 185. Thus, the adjuster nut 185 is subjected to the sum of thrust generated between the ball grooves 158 and 172 of the rotary-rectilinear ramp 150 and the rotary ramp 151 and thrust generated in the screw mechanism 129, i.e. thrust generated in the thread engagement between the internal thread 204 of the base nut 186 and the external thread 191 of the adjuster nut 185. At this time, as shown in FIG. 21C, the respective axially facing surfaces 167A and 198A of each fitting projection 167 of the rotary ramp 151 and the corresponding fitting recess 198 of the base nut 186 abut against each other, thus removing the gap S (i.e. the state shown in FIG. 16C). That is, when the relative distance in the direction of the rotation axis between the rotary ramp 151 as a follower member and the rotary-rectilinear ramp 150 as an input member increases, the base nut 186 and the rotary ramp 151 abut against each other in their mutual axial direction. Consequently, the urging force of the wave clip 205 no longer acts on the base nut 186. Hence, the wave clip 205 will not interfere with the advancement of the rotary-rectilinear ramp 150. Thus, the engagement made between the base nut 186 and the rotary ramp 151 by the wave clip 205 allows the rotational force of the motor 38 to be converted into rectilinear motion efficiently, without interference with the advancement of the rotary-rectilinear ramp 150.

Thus, in this embodiment, the screw mechanism 129 is first activated, that is, the external thread 176 of the push rod 173 and the internal thread 190 of the adjuster nut 185 are first moved to rotate relative to each other, to advance the push rod 173, thereby advancing the piston 12 to obtain pressing force to be applied to the disk rotor D. Therefore, it is possible, by the operation of the screw mechanism 129, to adjust the original position of the push rod 173 relative to the piston 12, which changes with the wear of the inner and outer brake pads 2 and 3 with time.

The ECU 70 drives the motor 38 until the pressing force applied to the disk rotor D from the inner and outer brake pads 2 and 3 reaches a predetermined value, for example, until the electric current supplied to the motor 38 reaches a predetermined value. When the ECU 70 detects that the pressing force applied to the disk rotor D has reached a predetermined value from the fact that the electric current of the motor 38 has reached a predetermined value, the ECU 70 stops the supply of electric current to the motor 38. Thereupon, in the ball-and-ramp mechanism 128, the rotation of the rotary-rectilinear ramp 150 stops, and, therefore, no thrust is applied to the rotary ramp 151 by the rolling action of the balls 32 between the ball grooves 158 and 172. The rotary ramp 151 is subjected to a counterforce to the pressing force applied to the disk rotor D, which is transmitted through the piston 12 and the rotary-rectilinear ramp 150. In this regard, however, the adjuster nut 185 is in thread engagement with the push rod 173 through the internal thread 190 and the external thread 176, which are irreversibly engaged with each other, and the base nut 186 is also in thread engagement with the adjuster nut 185 through the internal thread 204 (first thread) and the external thread 191 (second thread), which are irreversibly engaged with each other. Therefore, the rotary ramp 151 cannot rotate but is kept stopped, so that the piston 12 is held in the braking position. Thus, braking force is retained, and the operation of the parking brake is completed. In this state, the counterforce to the pressing force of the piston 12 is transmitted to the bottom wall 9 of the cylinder 10 through the push rod 173, the adjuster nut 185, the base nut 186, and the thrust bearing 58 to serve as retaining force for the piston 12. In this embodiment, the retaining force for the piston 12 does not act on the thrust bearing 56, for which a thrust bearing of relatively small diameter has to be used unavoidably. Therefore, the durability of the disk brake 1c is improved as compared to a disk brake in which the retaining force for the piston 12 acts on the thrust bearing 56 as in the first embodiment.

Next, when the parking brake is to be released, the parking switch 71 is actuated to perform a parking brake release operation. In response to the actuation of the parking switch 71, the ECU 70 drives the motor 38 to rotate in the direction for returning the piston 12, i.e. in the direction for moving the piston 12 away from the disk rotor D. Consequently, the spur wheel multistage speed reduction mechanism 37 and the planetary gear speed reduction mechanism 36 operate in the direction for returning the piston 12. At this time, there is no axial force acting on the rotary-rectilinear ramp 150. Therefore, the rotary-rectilinear ramp 150 cannot transmit rotational torque to the rotary ramp 151 until the balls 32 return to their initial positions between the ball grooves 158 and 172 of the rotary-rectilinear ramp 150 and the rotary ramp 151. Accordingly, only the rotary-rectilinear ramp 150 rotates at the initial stage of the parking brake release operation.

Next, when the rotary-rectilinear ramp 150 rotates to the position shown in FIG. 22B and the balls 32 return to their initial positions in the rotational direction between the ball grooves 158 and 172 of the rotary-rectilinear ramp 150 and the rotary ramp 151, the rotary-rectilinear ramp 150, as shown in FIGS. 23A to 23C, starts to transmit rotational torque to the rotary ramp 151 through the balls 32. At this middle stage of the parking brake release operation, the rotary-rectilinear ramp 150 cannot rotate the rotary ramp 151 alone because the counterforce to the pressing force applied to the disk rotor D is being applied to the push rod 173. That is, rotational torque T4 required to rotate the external thread 191 of the adjuster nut 185 and the internal thread 204 of the base nut 186 relative to each other is smaller than the total required rotational torque T5+T3, which is the sum of rotational torque T5 required to rotate the external thread 176 of the push rod 173 and the internal thread 190 of the adjuster nut 185 and rotational resistance torque T3 applied by the spring clutch 208. Accordingly, the rotation of the rotary-rectilinear ramp 150 causes the rotary ramp 151, the base nut 186, and the adjuster nut 185 to rotate together as one unit against the urging force of the spring clutch 208. Consequently, the internal thread 190 of the adjuster nut 185 and the external thread 176 of the push rod 173 rotate relative to each other, and the push rod 173 retracts away from the piston 12.

As the push rod 173 retracts, the pressing force applied to the disk rotor D from the piston 12 decreases, and, eventually, the rotational torque T4 required to rotate the external thread 191 of the adjuster nut 185 and the internal thread 204 of the base nut 186 relative to each other becomes smaller than the rotational resistance torque T3 applied by the spring clutch 208. Consequently, as shown in FIGS. 24A to 24C, the rotation of the adjuster nut 185 stops, and the rotary-rectilinear ramp 150 retracts while rotating, together with the rotary ramp 151 and the base nut 186, relative to the adjuster nut 185 to return to the initial position also in the axial direction. If the rotary-rectilinear ramp 150 is further rotated in the retracting direction, the base nut 186 is urged to advance relative to the adjuster nut 185 because the rotary-rectilinear ramp 150 and the rotary ramp 151 cannot axially move toward each other any more. In this regard, however, the base nut 186 and the adjuster nut 185 are urged toward the rotary ramp 151 by the urging force of the wave clip 205. When the urging force of the wave clip 205 increases so that the rotational torque T4 required to rotate the external thread 191 of the adjuster nut 185 and the internal thread 204 of the base nut 186 relative to each other becomes larger than the rotational resistance torque T3 applied by the spring clutch 208, the adjuster nut 185 and the base nut 186 stop rotating relative to each other but rotate together in the same direction. Consequently, the push rod 173 is further retracted away from the piston 12 by the relative rotation between the internal thread 190 of the adjuster nut 185 and external thread 176 of the push rod 173. The ECU 70 controls so as to stop the motor 38 when the push rod 173 reaches the initial position where the push rod 173 is appropriately away from the piston 12.

As has been stated above, the disk brake 1c according to the third embodiment offers the following advantageous effects in the same way as the disk brake 1a according to the first embodiment. That is, to propel and hold the piston 12 in the braking position as in the case of applying the parking brake, pressing force is applied to the disk rotor D from the inner and outer brake pads 2 and 3. At this time, it is possible to retain the pressing force applied to the disk rotor D while ensuring high operational efficiency for the piston holding mechanism 130 by combining the ball-and-ramp mechanism 128 of high mechanical efficiency with the thread engagement between the internal thread 204 of the base nut 186 and the external thread 191 of the adjuster nut 185, which has low mechanical efficiency. Thus, the structure of the disk brake 1c can be simplified as compared to the ratchet mechanism employed in the conventional disk brake, and the production efficiency of the disk brake 1c can be improved.

In the disk brake 1c according to the third embodiment, the piston 12 is subjected to not only pressing force from the thread engagement between the internal thread 204 of the base nut 186 and the external thread 191 of the adjuster nut 185 but also pressing force from the ball-and-ramp mechanism 128, and it is therefore possible to obtain desired braking force even if the motor 38 is downsized, as in the case of the disk brake 1a according to the first embodiment. Moreover, in the disk brake 1c according to the third embodiment, the urging force applied by the wave clip 205 to move the rotary-rectilinear ramp 150 toward the rotary ramp 151 does not act when the piston 12 is to be pressed. Therefore, the disk brake 1*c* can be further improved in operational efficiency. When the parking brake is activated with the hydraulic pressure acting on the caliper body 6 and the hydraulic pressure is released thereafter, the pressing force acting on the piston 12 increases substantially in proportion to the amount of hydraulic pressure released. In this regard, however, during retaining the braking force, the pressing force acting on the piston 12 is transmitted to the rotary ramp 151 from the screw mechanism 129 through the base nut 186. Therefore, it is possible to reduce the axial load acting on the thrust bearing 56.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Applications No. 2011-089268, filed on Apr. 13, 2011, and No. 2012-029402, filed on Feb. 14, 2012. The entire disclosure of Japanese Patent Applications No. 2011-089268, filed on Apr. 13, 2011, and No. 2012-029402, filed on Feb. 14, 2012 including specification, claims, drawings and summary is incorporated herein by reference in its entirety.

What is claimed is:

1. A disk brake comprising:
  a pair of pads disposed at opposite sides, respectively, of a rotor to face each other across the rotor in a direction of an axis of the rotor;
  a piston pressing one of the pair of pads against the rotor;
  a caliper body having a cylinder in which the piston is movably disposed;
  an electric motor provided on the caliper body; and
  a parking brake mechanism provided in the caliper body to propel and hold the piston in a braking position;
  the parking brake mechanism having:
    a ball-and-ramp mechanism;
    a rotating member rotatably provided in a rotor diametrical direction of a ball groove of the ball-and-ramp mechanism; and
    a screw mechanism,
    wherein the ball-and-ramp mechanism has a first ramp which can be rotated and rectilinearly moved, a second ramp, and a ball interposed between the first ramp and the second ramp,
    wherein the screw mechanism comprises a first thread provided on the first ramp and a second thread provided on the rotating member and engaged with the first thread, and
    wherein rotation of the electric motor causes the ball-and-ramp mechanism and the screw mechanism to move the piston to the braking position, and the piston is held in the braking position by the first thread and the second thread of the screw mechanism.

2. The disk brake of claim 1, wherein:
  the second ramp is an input member rotated by rotation of the electric motor transmitted thereto; and
  the first ramp is a follower member rotating together with the input member so that a relative distance between the follower member and the input member in a direction of an axis of rotation increases when a rotation difference is generated between the follower member and the input member;
  wherein the follower member transmits rotational force to the screw mechanism.

3. The disk brake of claim 2, wherein the parking brake mechanism has:
  an abutting member abutting against the piston when the relative distance between the input member and the follower member increases;
  the screw mechanism being provided between the abutting member and a bottom of the cylinder;
  the screw mechanism having:
  a screw member rotatable relative to the first thread so that the first thread and the second thread move relative to each other by a distance equal to an increase in the relative distance when a rotation difference is generated between the input member and the follower member;
  the screw member being configured to transmit thrust generated in the abutting member when the piston is held, to the caliper body through a thread engagement between the first thread and the second thread.

4. The disk brake of claim 3, wherein the input member is rotated and rectilinearly moved by the electric motor to move the screw member;
  the follower member being disposed between the input member and the bottom of the cylinder;
  wherein a cylindrical member is provided between the follower member and the screw member, the cylindrical member having the first thread formed on one end thereof, the first thread being engaged with the screw member, another end of the cylindrical member extending over the input member to an outer periphery of the follower member to engage with the follower member.

5. The disk brake of claim 2,
  wherein the parking brake mechanism
  has an abutting member abutting and pressing the piston,
  wherein the screw mechanism has:
    an abutting member thread provided on the abutting member;
    a first thread circumferentially provided on the follower member; and
    a connecting member having a second thread engaged with the first thread and a third thread engaged with the abutting member thread.

6. The disk brake of claim 5, wherein the input member is rotated and rectilinearly moved by the electric motor to move the connecting member;
  the follower member being disposed between the input member and a bottom of the cylinder;
  wherein a cylindrical member is provided between the follower member and the connecting member, the cylindrical member having the first thread formed on one end thereof, the first thread being engaged with the connecting member, another end of the cylindrical member extending over the input member to an outer periphery of the follower member to engage with the follower member.

7. The disk brake of claim 2, wherein the screw mechanism has:
  a pressing member pressing the piston when a relative distance between the input member and the follower member increases; and
  a cylindrical member that is thread-engaged at one end thereof with the pressing member, another end of the cylindrical member extending to an outer periphery of the follower member to engage with the follower member;
  the cylindrical member and the follower member being abuttable against each other in an axial direction thereof when the relative distance between the follower member and the input member in the direction of the axis of rotation increases;
wherein the cylindrical member is engaged with the follower member by an urging member urging the cylindrical member toward a bottom of the cylinder.

8. The disk brake of claim 2, wherein the screw mechanism comprises:
a first thread formed on an outer periphery of the follower member; and
a second thread formed on a nut member interposed between the input member and a bottom of the cylinder, the second thread being engaged with the first thread.

9. The disk brake of claim 8, wherein a pressing member is interposed between the parking brake mechanism and the piston in thread engagement therewith, the pressing member comprising at least two thread members, the pressing member being capable of being extended and contracted by rotation of the nut member.

10. The disk brake of claim 1, wherein:
the second ramp is a fixed disk member restrained from rotating relative to the caliper body;
the first ramp is a movable disk member facing at one side thereof the fixed disk member, the movable disk member being rotated by rotation of the electric motor transmitted thereto, thereby moving in an axial direction of the rotor to press the piston at an other side of the movable disk member; and
the screw mechanism is formed on an inner peripheral side of the movable disk member.

11. A disk brake comprising:
a piston pressing one of a pair of pads against a rotor, the pads being disposed at opposite sides, respectively, of the rotor to face each other across the rotor in a direction of an axis of the rotor;
a caliper body having a cylinder in which the piston is movably disposed;
an electric motor provided on the caliper body; and
a parking brake mechanism provided in the caliper body to propel and hold the piston in a braking position,
the parking brake mechanism having:
a ball-and-ramp mechanism moving the piston to the braking position in response to rotation of the electric motor;
a rotating member rotatably provided in a rotor diametrical direction of a ball groove of the ball-and-ramp mechanism; and
a screw mechanism holding the piston in the braking position after moving the piston to the braking position, together with the ball-and-ramp mechanism, in response to rotation of the electric motor;
wherein the ball-and-ramp mechanism has a first ramp which can be rotated and rectilinearly moved, a second ramp, and a ball disposed between the first ramp and the second ramp,
wherein the screw mechanism comprises a first thread provided on the first ramp and a second thread provided on the rotating member and engaged with the first thread,
wherein the piston is held in the braking position by the first thread and the second thread of the screw mechanism,
wherein the second ramp is an input member rotated by rotation of the electric motor transmitted thereto, and
wherein the first ramp is a follower member rotating together with the input member so that a relative distance between the follower member and the input member in a direction of an axis of rotation increases when a rotation difference is generated between the follower member and the input member, and
wherein the follower member transmits rotational force to the screw mechanism.

12. The disk brake of claim 11, wherein:
the parking brake mechanism has and abutting member abutting against the piston when the relative distance between the input member and the follower member increases; and
the screw mechanism is provided between the abutting member and a bottom of the cylinder,
the screw mechanism having a screw member rotating rotatable relative to the first thread so that the first thread and the second thread move relative to each other by a distance equal to an increase in the relative distance when a rotation difference is generated between the input member and the follower member,
the screw member being configured to transmit thrust generated in the abutting member when the piston is held, to the caliper body through a thread engagement between the first thread and the second thread.

13. The disk brake of claim 12, wherein the input member is rotated and rectilinearly moved by the electric motor to move the screw member;
the follower member being disposed between the input member and the bottom of the cylinder;
wherein a cylindrical member is provided between the follower member and the screw member, the cylindrical member having the first thread formed on one end thereof, the first thread being engaged with the screw member, another end of the cylindrical member extending over the input member to an outer periphery of the follower member to engage with the follower member.

14. The disk brake of claim 13, wherein the cylindrical member and the follower member are abuttable against each other in an axial direction thereof when the relative distance between the follower member and the input member in the direction of the axis of rotation increases;
the cylindrical member being engaged with the follower member by an urging member urging the cylindrical member toward the bottom of the cylinder.

15. The disk brake of claim 11, wherein
the parking brake mechanism has:
an abutting member abutting against and pressing the piston;
the screw mechanism having:
an abutting member thread provided on the abutting member;
a first thread circumferentially provided on the follower member; and
a connecting member having a second thread engaged with the first thread and a third thread engaged with the abutting member thread.

16. The disk brake of claim 15, wherein the input member is rotated and rectilinearly moved by the electric motor to move the connecting member;
the follower member being disposed between the input member and a bottom of the cylinder;
wherein a cylindrical member is provided between the follower member and the connecting member, the cylindrical member having the first thread formed on one end thereof, the first thread being engaged with the connecting member, another end of the cylindrical member extending over the input member to an outer periphery of the follower member to engage with the follower member.

17. The disk brake of claim 16, wherein the cylindrical member and the follower member are abuttable against each other in an axial direction thereof when the relative distance between the follower member and the input member in the direction of the axis of rotation increases;
the cylindrical member being engaged with the follower member by an urging member urging the cylindrical member toward the bottom of the cylinder.

18. A disk brake comprising:
a caliper body having a cylinder in which a piston is movably disposed to press a pad against a rotor, the caliper body further having an electric motor; and
a parking brake mechanism provided in the caliper body to propel and hold the piston in a braking position;
the parking brake mechanism having:
a ball-and-ramp mechanism for moving the piston to the braking position in response to rotation of the electric motor;
a rotating member rotatably provided in a rotor diametrical direction of a ball groove of the ball-and-ramp mechanism,
a screw mechanism holding the piston in the braking position after moving the piston to the braking position, together with the ball-and-ramp mechanism, in response to rotation of the electric motor; and
an abutting member abutting against the piston when a relative distance between the input member and the follower member increases;
wherein the ball-and-ramp mechanism has a first ramp which can be rotated and rectilinearly moved and a second ramp disposed in an axial direction of the rotor of the first ramp and away from the pad relative to the first ramp;
wherein the screw mechanism comprises a first thread provided on the first ramp and a second thread provided on the rotating member and engaged with the first thread;
wherein the second ramp is an input member rotated by rotation of the electric motor transmitted thereto;
wherein the first ramp is a follower member rotatable together with the input member so that a relative distance between the follower member and the input member in a direction of an axis of rotation increases when a rotation difference is generated between the follower member and the input member;
wherein the follower member transmits rotational force to the screw mechanism; and
wherein the screw mechanism has a screw member rotatable relative to the first thread so that the first thread and the second thread move relative to each other by a distance equal to an increase in the relative distance when a rotation difference is generated between the input member and the following member;
wherein the screw member is configured to transmit thrust generated in the abutting member when the piston is held, to the caliper body through a thread engagement between the first thread and the second thread, and the first thread and the second thread hold the piston in the braking position.

19. The disk brake of claim 18, wherein the input member is rotated and rectilinearly moved by the electric motor to move the screw member;
the follower member being disposed between the input member and a bottom of the cylinder;
wherein a cylindrical member is provided between the follower member and the screw member, the cylindrical member having the first thread formed on one end thereof, the first thread being engaged with the screw member, another end of the cylindrical member extending over the input member to an outer periphery of the follower member to engage with the follower member.

20. The disk brake of claim 19, wherein the cylindrical member and the follower member are abuttable against each other in an axial direction thereof when the relative distance between the follower member and the input member in the direction of the axis of rotation increases;
the cylindrical member being engaged with the follower member by an urging member urging the cylindrical member toward the bottom of the cylinder.

21. The disk brake of claim 10, wherein the parking brake mechanism has an abutting member abutting against the piston, the screw mechanism being provided between the abutting member and a bottom of the cylinder member,
the screw mechanism having a screw member provided with the second thread and rotatable relative to the first thread,
the screw member being configured to transmit thrust generated in the abutting member when the piston is held, to the caliper body through a thread engagement between the first thread and the second thread.

22. The disk brake of claim 21, wherein the movable disk member is rotatable and rectilinearly movable by the electric motor to move the screw member,
the fixed disk member being disposed between the movable disk member to which rotation of the electric motor is transmitted, and a bottom of the cylinder,
wherein a cylindrical member is provided between the fixed disk member and the screw member, the cylindrical member having the first thread formed on one end thereof, the first thread being engaged with the screw member, another end of the cylindrical member extending over the movable disk member to an outer periphery of the fixed disk member to engage with the fixed disk member.

23. The disk brake of claim 10, wherein the parking brake mechanism has:
an abutting member abutting and pressing the piston;
wherein the screw mechanism has:
an abutting member thread provided on the abutting member;
a first thread circumferentially provided on the fixed disk member; and
a connecting member having a second thread engaged with the first thread and a third thread engaged with the abutting member thread.

24. The disk brake of claim 23, wherein the movable disk member is rotatable and rectilinearly movable by the electric motor to move the connecting member;
the fixed disk member being disposed between the movable disk member and a bottom of the cylinder;
wherein a cylindrical member is provided between the fixed disk member and the connecting member, the cylindrical member having the first thread formed on one end thereof, the first thread being engaged with the connecting member, another end of the cylindrical member extending over the movable disk member to an outer periphery of the fixed disk member to engage with the fixed disk member.

25. The disk brake of claim 10, wherein the screw mechanism has:
a pressing member pressing the piston when a relative distance between the movable disk member and the fixed disk member increases; and a cylindrical member that is thread-engaged at one end thereof with the pressing member, another end of the cylindrical member extending to an outer periphery of the fixed disk member to engage with the fixed disk member, the cylindrical member and the fixed disk member being abuttable against each other in an axial direction thereof when the relative distance between the fixed disk member and the movable disk member in the direction of the axis of rotation increases, wherein the cylindrical member is engaged with the fixed disk member by an urging member urging the cylindrical member toward a bottom of the cylinder.

26. The disk brake of claim 10, wherein the screw mechanism comprises:
a first thread formed on an outer periphery of the fixed disk member; and
a second thread formed on a nut member interposed between the movable disk member and a bottom of the cylinder, the second thread being engaged with the first thread.

27. The disk brake of claim 26, wherein a pressing member is interposed between the parking brake mechanism and the piston in thread engagement therewith, the pressing member comprising at least two thread members, the pressing member being capable of being extended and contracted by rotation of the nut member.

* * * * *